United States Patent [19]

Raymond et al.

[11] Patent Number: 4,639,877
[45] Date of Patent: Jan. 27, 1987

[54] PHRASE-PROGRAMMABLE DIGITAL SPEECH SYSTEM

[75] Inventors: William J. Raymond, Barrington; Robert L. Morgan, Rolling Meadows; Ricky L. Miller, Elgin, all of Ill.

[73] Assignee: Jostens Learning Systems, Inc., Minneapolis, Minn.

[21] Appl. No.: 469,482

[22] Filed: Feb. 24, 1983

[51] Int. Cl.⁴ .............................................. G10L 5/00
[52] U.S. Cl. .................................. 364/513.5; 381/51
[58] Field of Search ....................... 381/51, 52, 53, 36, 381/37, 38, 39, 40; 364/513.5, 513, 200, 900

[56] References Cited

U.S. PATENT DOCUMENTS

Re. 30,991  7/1982  Ostrowski .
3,641,496   2/1972  Slavin .
3,654,619   4/1972  Tishman .
3,996,554  12/1976  Ives et al. .
4,000,565   1/1977  Overby et al. .
4,060,848  11/1977  Hyatt .
4,060,915  12/1977  Conway .
4,163,120   7/1979  Baumwolspiner .
4,176,470  12/1979  Fosner et al. .
4,185,169   1/1980  Tanimoto et al. .
4,185,170   1/1980  Morino et al. .
4,189,779   2/1980  Brautingham .
4,209,781   6/1980  Puri et al. .
4,209,836   6/1980  Wiggins, Jr. et al. .
4,215,240   7/1980  Ostrowski .
4,234,761  11/1980  Wiggins, Jr. et al. .
4,266,096   5/1981  Inoue et al. .
4,272,649   6/1981  Pfeiffer .
4,276,444   6/1981  Tanimoto et al. .
4,281,994   8/1981  Dell et al. .
4,296,279  10/1981  Stork .
4,301,328  11/1981  Dorais .
4,304,964  12/1981  Wiggins, Jr. et al. .
4,304,965  12/1981  Blanton et al. .
4,310,825   1/1982  Tsunoda et al. .
4,312,065   1/1982  Ulug .
4,316,283   2/1982  Ulug .
4,317,196   2/1982  Ulug .
4,317,197   2/1982  Ulug .
4,319,083   3/1982  Wiggins et al. .
4,323,732   4/1982  Wiggins et al. .
4,331,836   5/1982  Wiggins, Jr. et al. .
4,334,306   6/1982  Ulug .
4,335,275   6/1982  Brantingham .
4,335,277   6/1982  Puri ..................................... 364/900
4,337,375   6/1982  Freeman .
4,375,097   2/1983  Ulug .
4,398,059   8/1983  Lin et al. .
4,403,965   9/1983  Hawkins .
4,423,290  12/1983  Yoshida et al. ....................... 381/51
4,468,805   8/1984  Wiggins, Jr. et al. ............... 381/51
4,491,958   1/1985  Umemura et al. .................... 381/51

FOREIGN PATENT DOCUMENTS 0054620  6/1982  European Pat. Off. .

OTHER PUBLICATIONS

Wickey, D. O., "Synthesizer Chip Translates LPC to Speech Econically", Electronic Design, vol. 29, Jun. 11, 1981, pp. 213-218.
Schmid, H., "Schnittstellen Zwischen Monolithischen Prozessoren und der Aussenwelt", Electronik, No. 11, 1980, pp. 67-72, (Translation Included).
Lin, Kun-Shan, et al., "Software Rules Give Personal Computer Real Word Power", International Electronics, vol. 53, No. 3, Feb. 10, 1981, pp. 122-125.
Schalk, T. B. et al., "Voice Synthesis and Recognition", Mini-Micro Systems, vol. 15, No. 12, Dec., 1982, pp. 146-160.
"Flexible Voice Response Unite Will Have Many Messages for Telephone Subscribers", Electronics, vol. 51, No. 3, Feb. 2, 1978.

Primary Examiner—E. S. Matt Kemeny
Attorney, Agent, or Firm—Fitch, Even, Tabin & Flannery

[57] ABSTRACT

A digital speech processor operates in parallel with a programmable digital computer to generate sequences of variable-length speech phrases and pauses at the request of the computer. A speech memory within the speech processor contains digitally-encoded speech data segments of varying length. A separate command memory region, accessible to and loadable by the computer, can be loaded with a plurality of commands.

When sequentially executed by the speech processor, these commands cause the processor to generate an arbitrary sequence of spoken phrases and pauses without intervention by the computer. Each two-byte command causes the speech processor to retrieve from the speech memory a particular speech data segment and convert it into speech, or to pause for a time interval specified by a number within the command.

19 Claims, 30 Drawing Figures

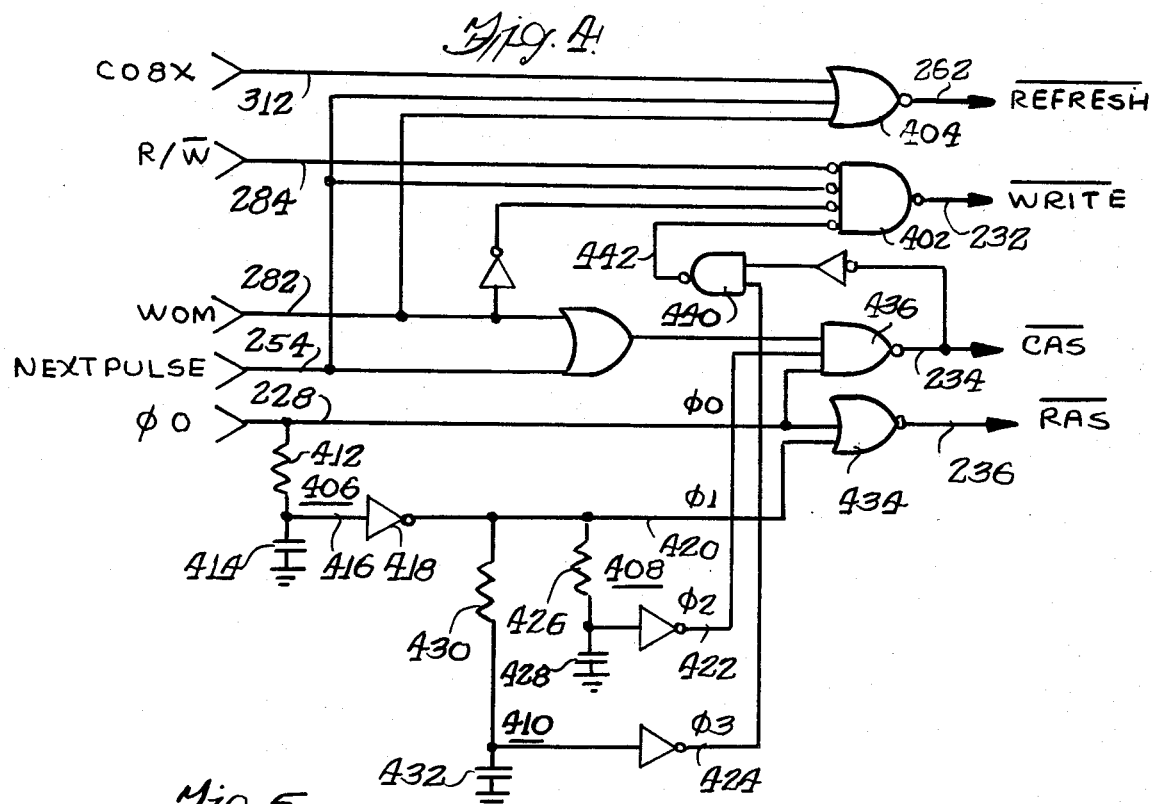
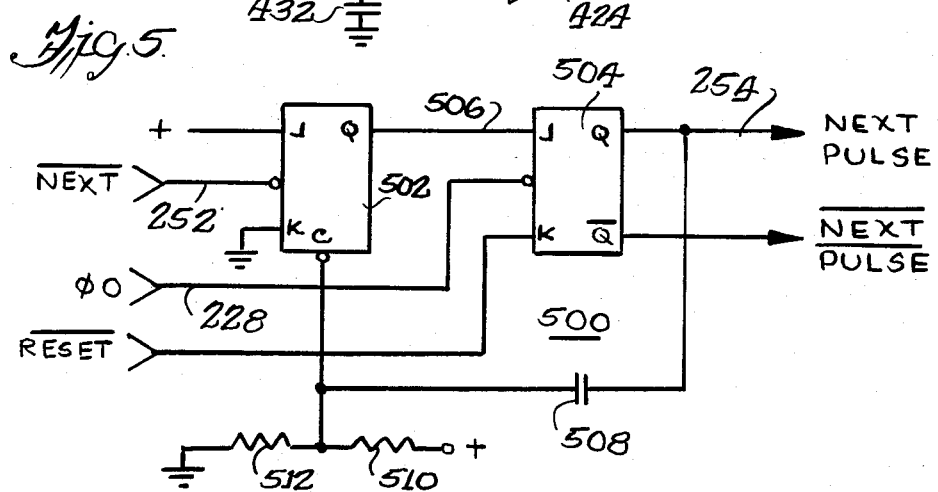
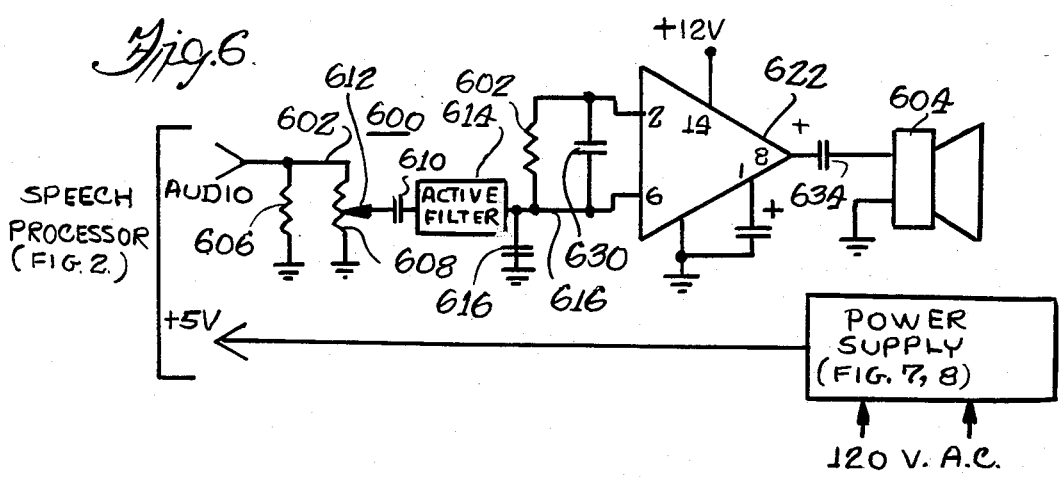

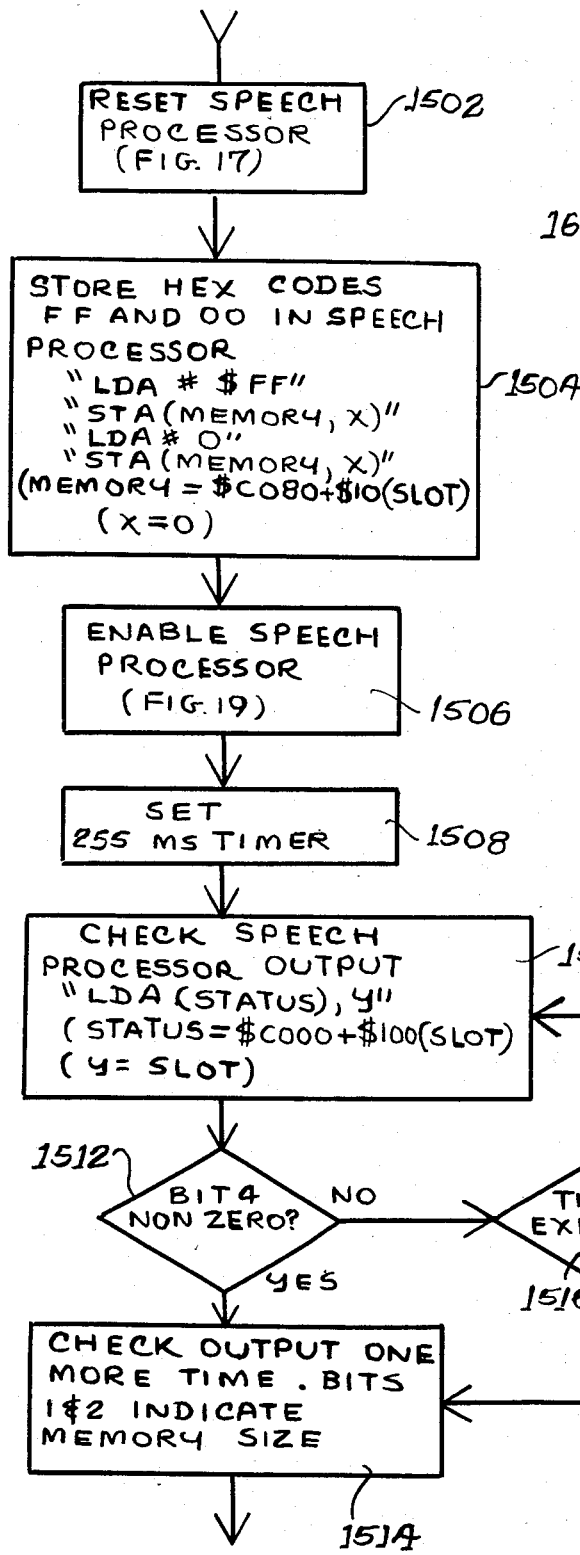
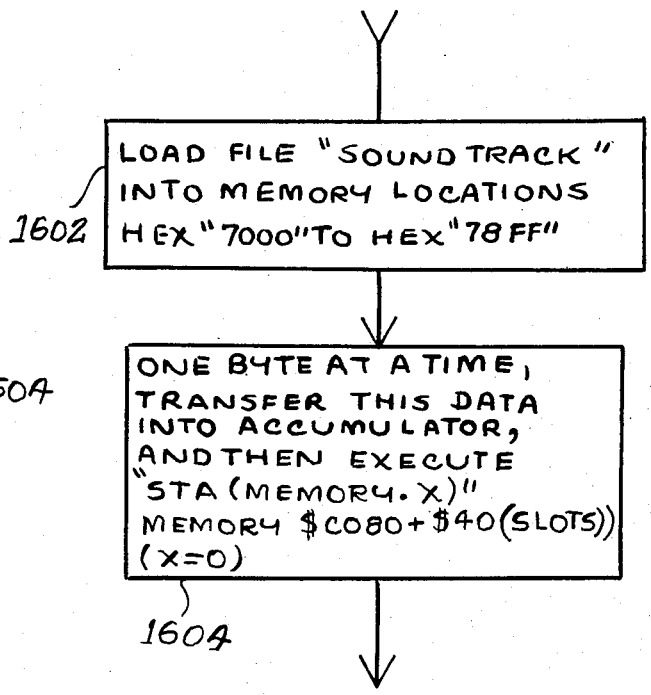

Fig. 17.

```
         │
         ▼
┌─────────────────────┐
│  RESET ADDRESS      │
│  COUNTER IN SPEECH  │
│  PROCESSOR          │
│  "LDA SLOT"         │
│  "LDA RESET TO 4"   │
│  (RESET TO = $C081) │
└─────────────────────┘
         │
         ▼
```

Fig. 18.

```
         │
         ▼
      ( SAY THIS )
         │
         ▼
┌─────────────────────┐
│  DISPLAY            │
│  "HEX PHRASE #"     │──1802
│  DISPLAY SPACE      │
└─────────────────────┘
         │
         ▼
┌─────────────────────┐
│  EXECUTE            │
│  PACK               │──1804
│  (FIG. 20)          │
└─────────────────────┘
         │
         ▼
       ╱ FIRST ╲
 YES  ╱  HEX BYTE ╲  NO
◄────╱    > 2?    ╲────►
      ╲   1806    ╱
       ╲         ╱
         │YES        │NO
         ▼           ▼
   ╱ FIRST ╲     ┌──────────┐
  ╱ HEX BYTE╲    │  SPEECH  │
 ╱  ≥ $C0?  ╲   │   CODE   │
  ╲  1808   ╱    └──────────┘
   ╲       ╱
YES │   NO │
    ▼      ▼
 ERROR   ┌────────┐
 RETURN  │ DELAY  │
         │ CODE   │
         └────────┘
              │
              ▼
┌──────────────────────────┐
│  STORE FIRST             │
│  HEX BYTE IN             │
│  SPEECH PROCESSOR        │
│  "STA(MEMORY, X)"        │──1810
│  (MEMORY = $C080 +       │
│  $10(SLOT))(X=0)         │
└──────────────────────────┘
              │
              ▼
┌─────────────────────┐
│  EXECUTE            │
│  PACK               │──1812
│  (FIG. 20)          │
└─────────────────────┘
              │
              ▼
┌─────────────────────┐
│  STORE SECOND       │
│  HEX BYTE IN        │──1814
│  SPEECH             │
│  PROCESSOR          │
└─────────────────────┘
              │
              ▼
           RETURN
```

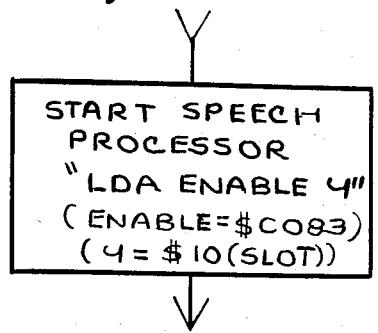
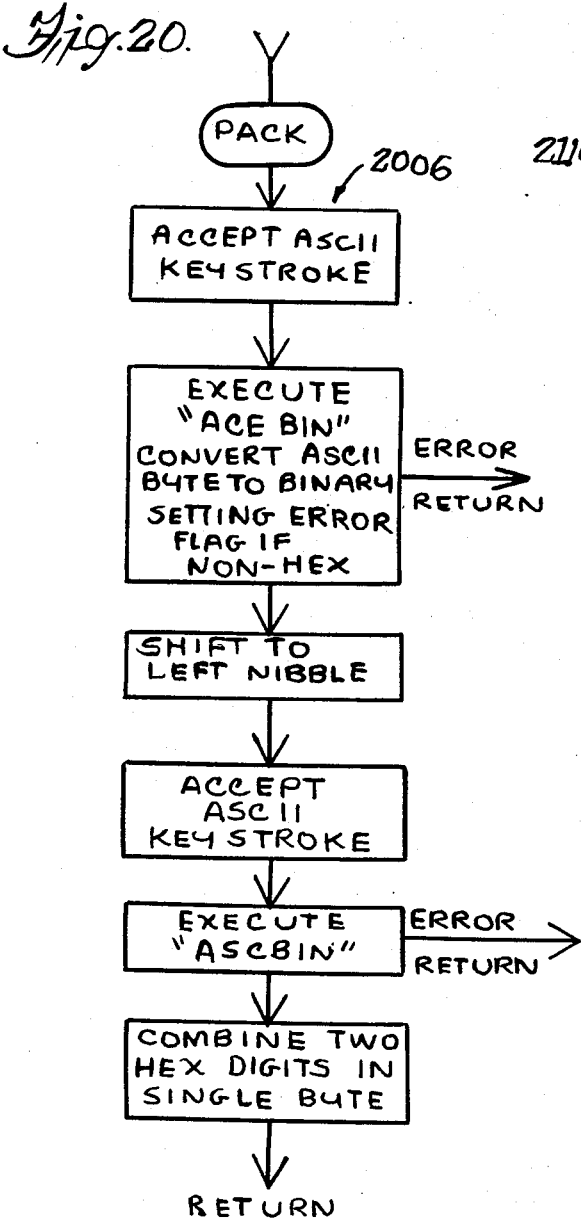
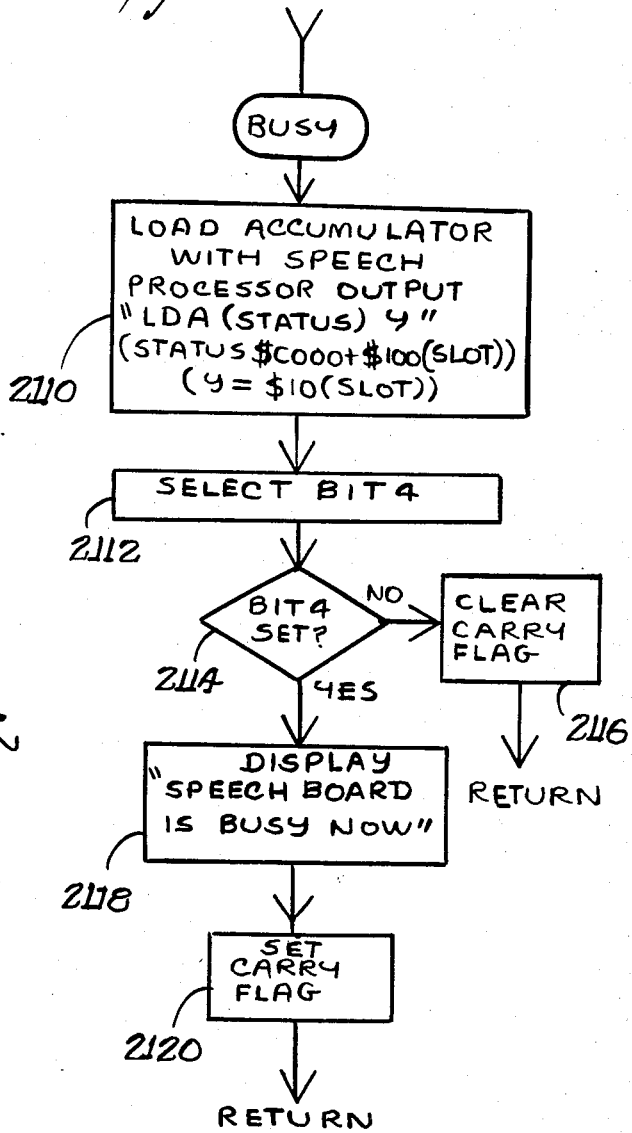

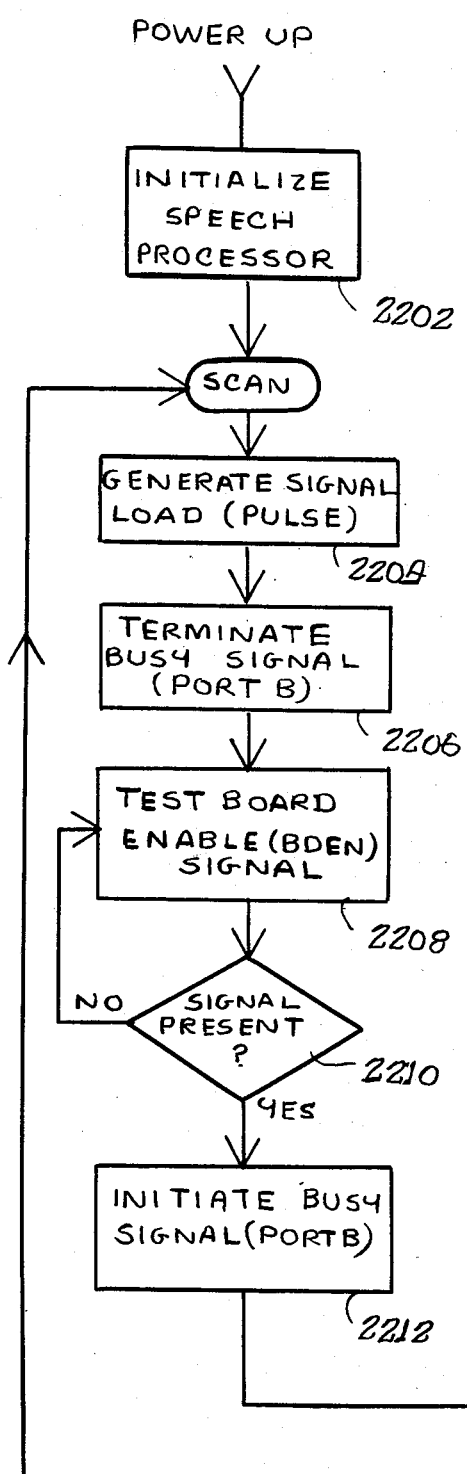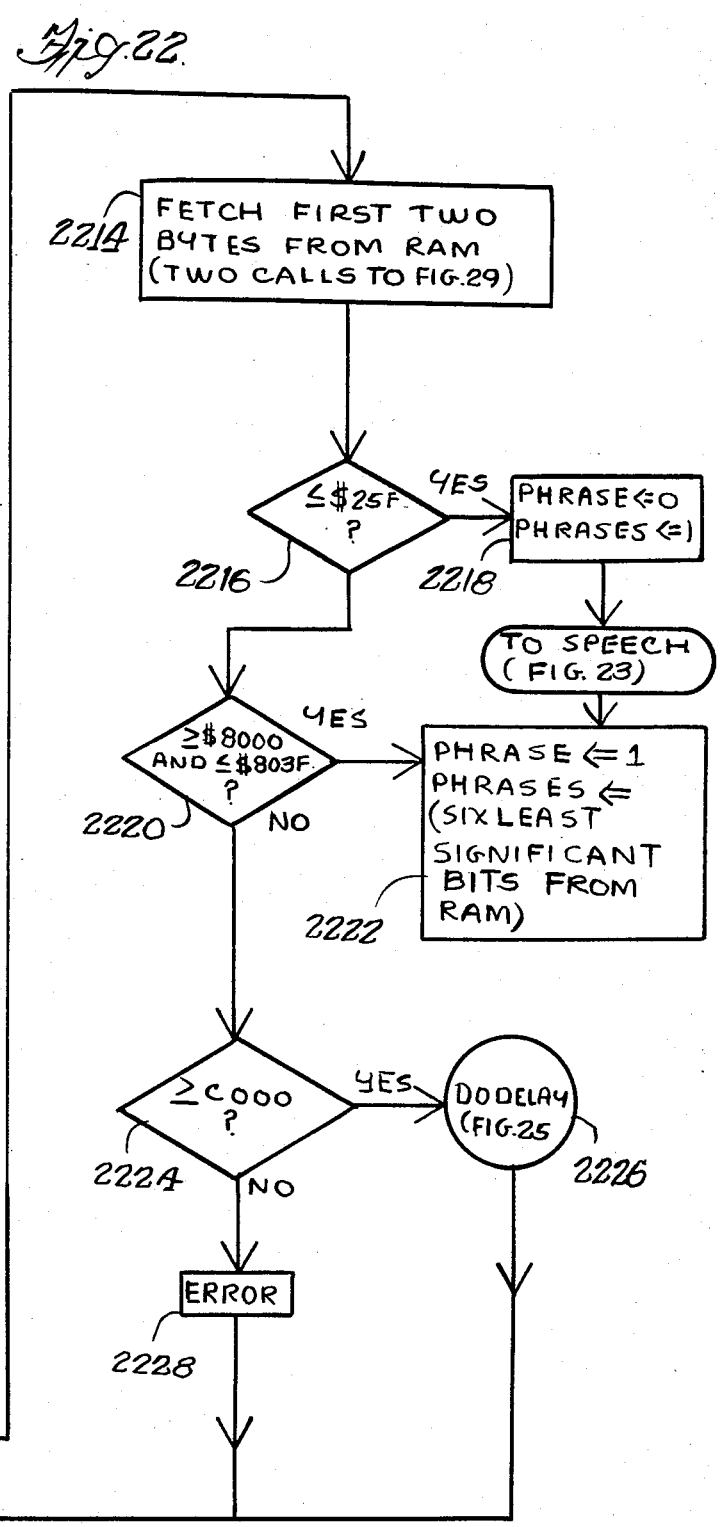
Fig. 22.

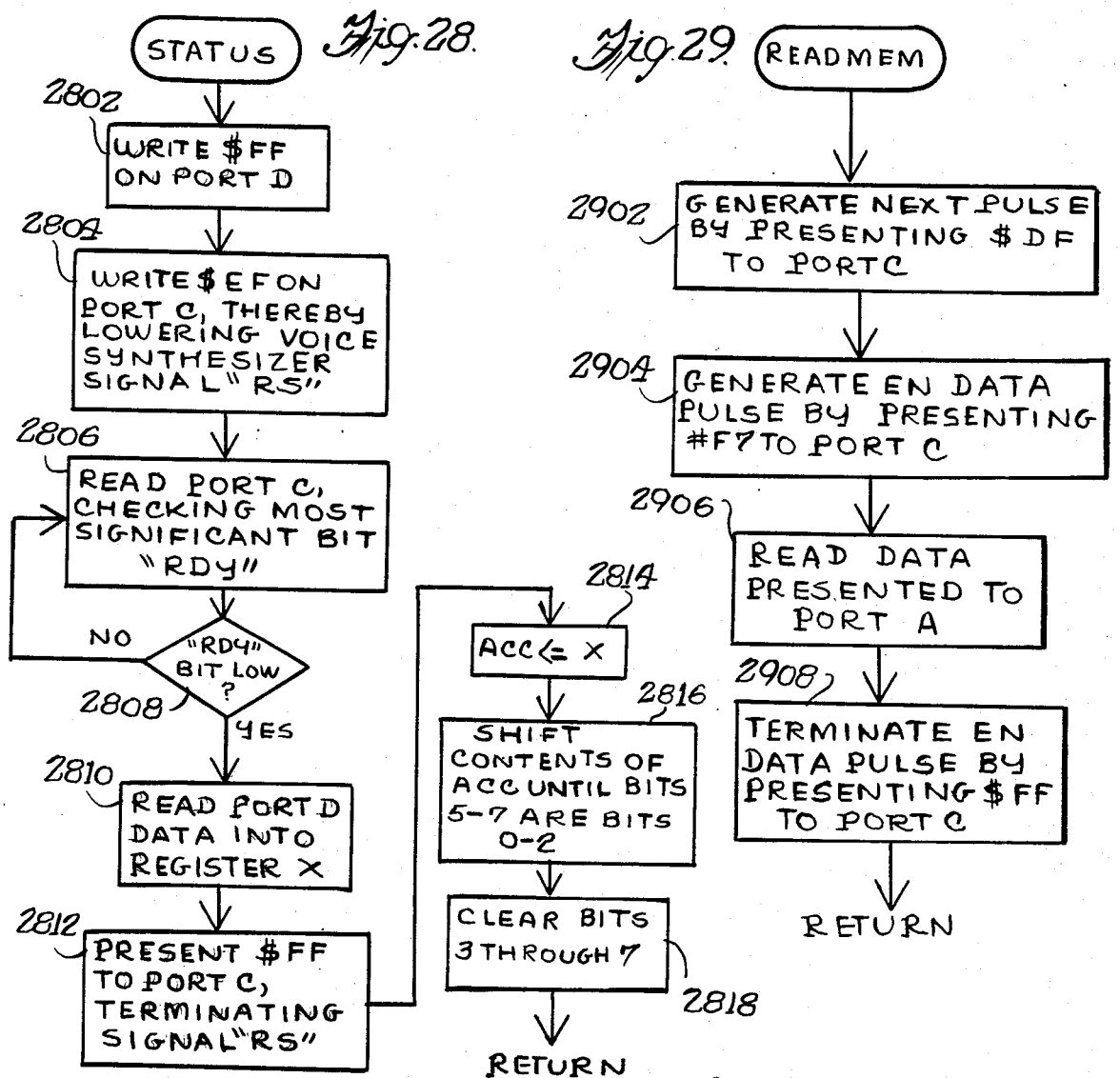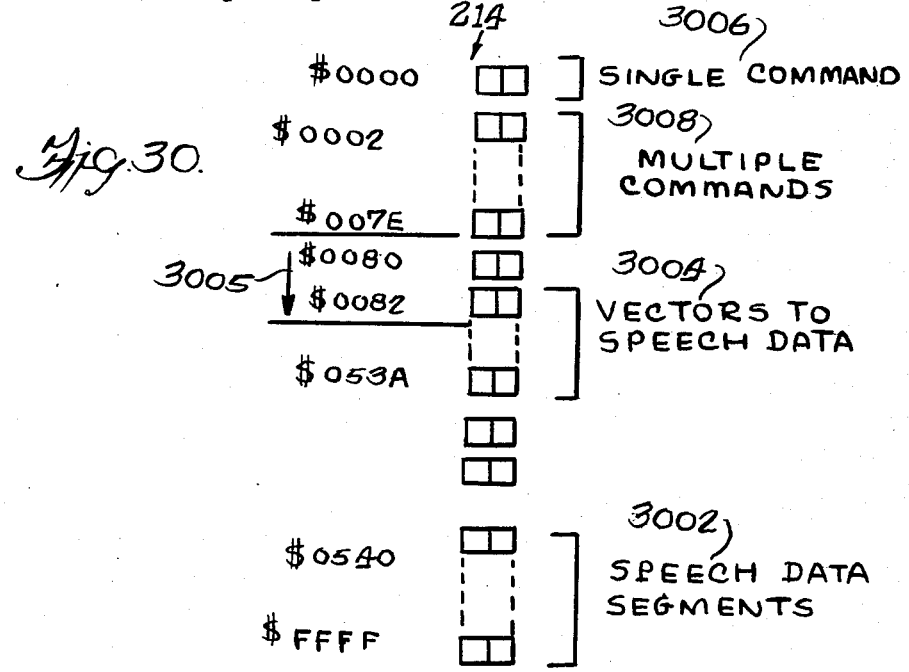

PHRASE-PROGRAMMABLE DIGITAL SPEECH SYSTEM

BACKGROUND OF THE INVENTION

1. Field of the Invention

This invention relates to interactive computer systems, and more particularly to such systems capable of transforming digitally encoded speech data segments into understandable speech. The invention is relevant to the field of computer-assisted instruction.

2. Description of the Prior Art

Digital speech processors that can operate in parallel with a programmable digital computer have come into wide spread use in recent years. An excellent example is the "Solid State Speech" (trademark) synthesizer that is widely used as an accessory for the Texas Instruments TI99/4A home computer. This system includes a synthesizer chip which can accept from the computer a stream of data that defines the individual phonemes of a spoken message. The message must be presented to the synthesizer at a controlled rate of speed and with relatively continuous active involvement of the computer in the speech generation process.

An alternative arrangement is disclosed in U.S. Pat. No. 4,335,277 which issued on June 15, 1982 to Ajay K. Puri. A read-only memory (12A and 12B in FIG. 2 of the patent) containing a plurality of variable length, digitally-encoded speech data segments is connected to a synthesizer chip that is connected in turn to a computer. The computer can initiate the conversion of an entire single data segment into speech by passing the address of the desired segment to the read-only memory and then starting the synthesizer chip to speak from that address onward. In this manner, a single speech segment may be generated in response to a single request from the computer, with no further computer intervention.

SUMMARY OF THE INVENTION

A primary object of the present invention is producing a computer-controlled digital speech system that can be programmed in advance by a computer to generate an entire speech message containing an arbitrarily-arranged sequence of spoken phrases each derived from separate and non-consecutively stored, variable-length, digitally-encoded speech data segments.

Another object of the invention is to permit such a digital speech system to be programmed to include silent passages of arbitrary length at scattered points within the spoken phrases without intervention of the computer.

A further object of the invention is to simplify as much as possible the task of programming the speech system to reduce the time it takes to produce computer-aided instructional exercises and to reduce the complexity of coordinating speech generation with other activities (graphics, music, etc.) carried out by an instructional computer.

Briefly described, the present invention constitutes the combination of a programmable digital computer and a digital speech processor. Associated with the digital speech processor is a speech memory that contains variable-length, digitally-encoded speech data segments. Also associated with the digital speech processor is a command memory wherein variable-length sequences of compact commands may be stored, each command calling either for the production of speech through the processing of one of the digitally-encoded speech segments or for the production of a silent or non-speech interval of a specified time duration. Both the speech memory and the command memory are random-access memories that the digital computer may load with speed data and command data.

The command data is compact and may be altered rapidly by the computer. Once the computer has loaded a given set of speech data into the memory, the computer may quickly program the speech processor to produce any arbitrary sequence of the corresponding speech intermixed with pauses. And while the speech processor is producing the speech, the computer is completely free to attend to other tasks, such as the production of a matching set of video images, animations, text written upon the face of the computer's display screen, music, and the like. There is no need for the computer to be interrupted by the speech processor at the end of every phrase to generate a pause or to instruct the speech processor of what phrase is to be generated next.

The speech memory is also programmable, so the computer may periodically load into the speech memory an entirely new set of speech data segments. Conceivably, the computer could even accept typed responses from the user (for example, the name of the child who is receiving instruction), convert those typed letter responses into corresponding speech data, load the speech data into the speech memory along with other words and phrases, and then program the speech processor to produce a verbal reply to the user that contains the spoken rendition of the user's response, e.g., the child's name spoken to him or her as part of a response.

The invention greatly simplifies the task of creating a computer-aided instructional program by permitting the author of such a program to separate the task of speech generation from all the other tasks. Upon entering an instructional frame, the author can create a speech command data sequence that includes the entire verbal portion of the instructional frame, optionally including short pauses between phrases and a much longer pause followed by a sequence of time-spaced encouragement prompts at times when a student response is required. Having programmed the speech processor in advance to produce an entire speech sequence for the instructional frame, the author may then focus all of the computer's resources upon animation, graphics, and other such tasks without any concern about speech. When the name of a number is to be spoken, the author can, in a single operation, program the speech system to say "one" [pause] "thousand" [pause] "seven" [pause] "hundred" [pause] "twenty" [pause] "three" without the need for any computer interrupts between digits.

Each variable-length speech data segment may be thought of as a phrase-generating subroutine executable by the speech processor. The speech processor also contains a delay subroutine that generates time delays. Which the computer feeds speech data segments into the speech processor, it is programming the speech data processor with specific phrase generating subroutines. Then when the computer produces a speech command sequence, the computer is writing a computer program that contains an arbitrary sequence of subroutine calls to the phrase generating subroutines intermixed with subroutine calls to the time delay generating subroutine within the speech processor. The computer feeds this speech command sequence program to the speech processor and then calls for its execution at an appropriate time.

In the preferred embodiment of the invention, the speech processor and the speech data and command data memories are mounted upon a card that may be inserted into a slot in the peripheral connector of the programmable computer, with leads extending to an external audio amplifier and speaker. The speech processor may thus be plugged quickly and simply into the programmable computer.

Further objects and advantages of the invention will be apparent from a reading of the detailed description of the invention that follows in conjunction with the drawings. The features of novelty that characterize the invention are pointed out with particularity in the claims annexed to, and forming a part of, this specification.

BRIEF DESCRIPTION OF THE DRAWINGS

FIG. 4 is a partly logic and partly circuit diagram of a timing logic 400 element of the speech processor 200;

FIG. 5 is a partly logic and partly circuit diagram of a next signal pulse generator 500 element of the speech processor 200;

FIG. 6 is a partly block and partly circuit diagram of an audio system 600 that forms an element of the computer system 100;

FIG. 15 is a flow diagram of the routine 1004 in FIG. 10;

FIG. 16 is a flow diagram of the element 1010 in FIG. 10;

FIG. 17 is a flow diagram of the element 1204 in FIG. 12, the element 1306 in FIG. 13, and the element 1502 in FIG. 15;

FIG. 18 is a flow diagram of the element 1206 in FIG. 12 and the element 1318 in FIG. 13;

FIG. 19 is a flow diagram of the element 1210 in FIG. 12 the element 1326 in FIG. 13, and the element 1506 in FIG. 19;

FIG. 20 is a flow diagram of a subroutine PACK that is called by the routine illustrated in FIG. 18;

FIG. 21 is a flow diagram of a subroutine BUSY that is called at 1202 in the SIMA portion of the speech control program 104 shown in FIG. 12 and that is also called at 1302 in the SIMB portion of the speech control program 104 shown in FIG. 13;

FIG. 22 is a flow diagram of the first half of the main part of the processor control program 204 which controls the microcomputer 202 of the speech processor 200;

FIG. 28 is a flow diagram of the subroutine STATUS that is called at 2702 and 2730 in FIG. 27;

FIG. 29 is a flow diagram of the subroutine READMEM that is called at 2214 in FIG. 22; at 2314, 2318, and 2322 in FIG. 23; at 2402 and 2412 in FIG. 24; and at 2712 and 2718 in FIG. 27; and FIG. 30 is a memory map indicating what data is stored in what locations within the speech memory 214 of the speech processor 200.

DESCRIPTION OF THE PREFERRED EMBODIMENT

Figure 1:
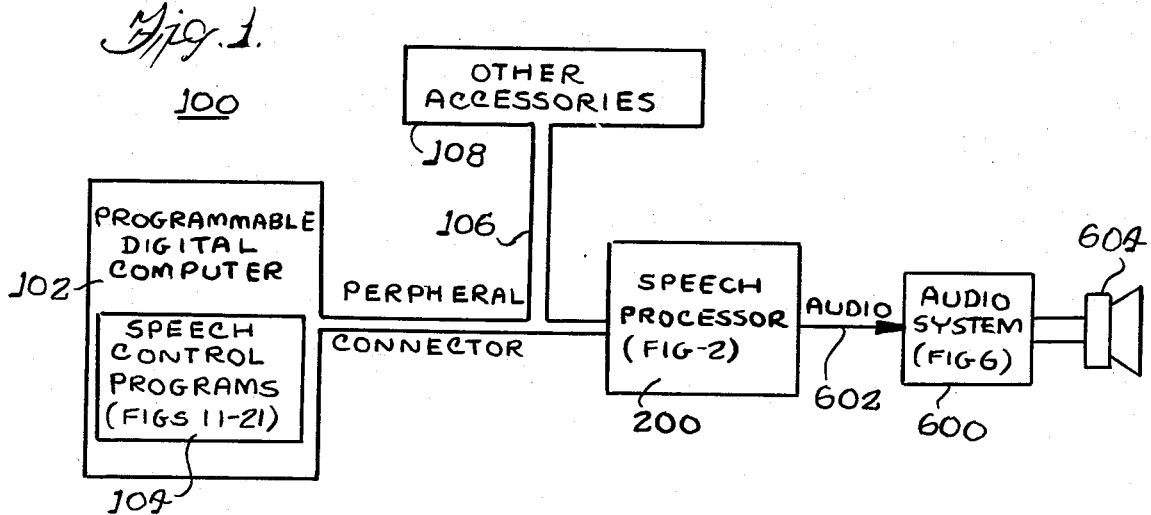
FIG. 1 is an overview block diagram of a digital speech system 100 designed in accordance with the present invention.

FIG. 1 presents an overview block diagram of a digital speech system 100 designed in accordance with the present invention. The system 100 includes a programmable digital computer 102. While many types of computers can be used in implementing the invention, the Apple II+ computer manufactured by Apple Computer, Incorporated, was selected for use in constructing the preferred embodiment of the invention because of its suitability for use in computer-aided instruction, its relatively low cost, and its present popularity among educators. The computer 102 typically would include a keyboard and a display monitor (not shown). Other accessories 108 of the computer 102 are attached to the computer 102 by means of a peripheral connector 106, and these might include disk drives and disk controllers, interfaces to external devices such as printers, local area networks, centralized computers, alternative central processing units, extra banks of memory, and other accessories 108. On the Apple II+ computer, the peripheral connector 106 includes eight Winchester #2HW25CO-111 50 pin printed circuit card edge connectors, the wiring of which are described on pages 105 to 109 of the book "Apple II Reference Manual" published in 1979 by Apple Computer, Incorporated. Hence, eight accessories may be connected to the Apple II+ peripheral connector. Other compact programmable digital computers provide equivalent peripheral connectors or equivalent connector means for enabling accessories to exchange information with them. In a preferred embodiment, the present invention contemplates connecting a speech processor 200 to the computer 102 by means of the peripheral connector 106. The speech processor 200 generates an output signal AUDIO 602 that is fed into an audio system 600 where the signal is filtered and amplified and fed to a speaker 604, which may be a loudspeaker as shown or a set of headphones, the headphones being possibly more appropriate for use in a classroom setting. The speech processor 200 and some or all of the audio system 600 can be mounted on a printed circuit board that plugs into the peripheral connector 106. The computer 102 can then be adapted for speech use by the simple act of inserting the speech processor 200 into a slot in the peripheral connector 106, leaving part or all of the audio system 600 and speaker 604 in a separate housing external to the computer.

In accordance with the teachings of the present invention, the programs of the computer 102 are augmented by the addition of a speech control program 104. The program 104 may take many different forms, and it may simply be part of a computer-aided instructional program that also performs many other tasks, such as monitoring keystrokes, writing letters, numbers, symbols, and colors on a display monitor, accessing data and programs stored on external memory files, and the like. But whatever its form and main function, the program 104 includes the necessary commands, instructions, and subroutines to communicate with the speech processor 200 and to cause speech to flow from the loudspeaker 604.

In the detailed description that follows, an exemplary program 104 is described which is used to demonstrate the operation of the speech processor 200 with an operator typing in hexadecimal numbers to the computer 102 to initiate the production of corresponding elements of speech. The program 104 disclosed herein thus simulates how the system would function if a computer aided instructional exercise were supplying the hexadecimal numbers calling for the generation of speech rather than an operator on a keyboard.

DESCRIPTION OF THE WIRED PORTIONS OF THE SYSTEM

The wiring details of the speech processor 200 and audio system 600 are set forth in FIGS. 2 through 8 of the drawings. These figures are partly block diagrams, partly logic diagrams, and partly circuit diagrams.

The logic diagrams of FIGS. 2 through 8 follow the following conventions: A signal is either a "normal" signal or an "inverted" signal. The names of signals are capitalized. If a signal name is overlined in the drawings and if a signal enters logic gates through a circle, then the signal is inverted. Inverted signals are "present" when at ground potential and "absent" when positive. If a signal name is not overlined and if a signal does not enter logic gates through a circle, then the signal is normal. Normal signals are "present" when positive and "absent" when at ground potential. Since the inverted or normal nature of a signal is apparent in the drawings, no mention of the normal or inverted state of a signal is normally made in this description. Instead, signals are simply described as "present" or "absent." Logic elements shaped like a letter "D" (for example, the gate 402 in FIG. 4) are control gates that "enable" the flow of one signal only if all the other signals entering the same gate are "present." Logic elements shaped like bullets or arrows (for example, the gate 206 in FIG. 2) are signal combining gates that permit any input signal to flow through the gate to its output. Triangular gates (for example, the gate 208 in FIG. 2) simply invert a signal from normal to inverted or vice versa, and these gates are frequently not even mentioned in the description that follows, since their function is made clear in the drawings. The rectangles 502 and 504 in FIG. 5 are "J-K master-slave" flip flops whose operation is described briefly below and much more fully in any textbook on digital logic design. Conventional symbols for circuit and logic components are used throughout the speech processor 200. Transistor-transistor logic may be used in constructing the logical portions of the system. The actual circuit configuration of the preferred embodiment differs somewhat in its details from the logic diagrams shown but gives rise to identically the same logical signal processing steps as these shown. For example, the two 2-1 select gates 210 and 212 in FIG. 2 were actually constructed from a sngle 4-1 select gate having two control inputs and four eight-line signal inputs, two of which eight-line signal inputs have their signal lines strapped together to provide three eight-line signal inputs. The intention of the figures is to explain, as clearly as possible, the logical relationships that exist between the signals, rather than the particular combination of logic chips that gave rise to that logical relationship.

The Speech Processor 200

Figure 2:
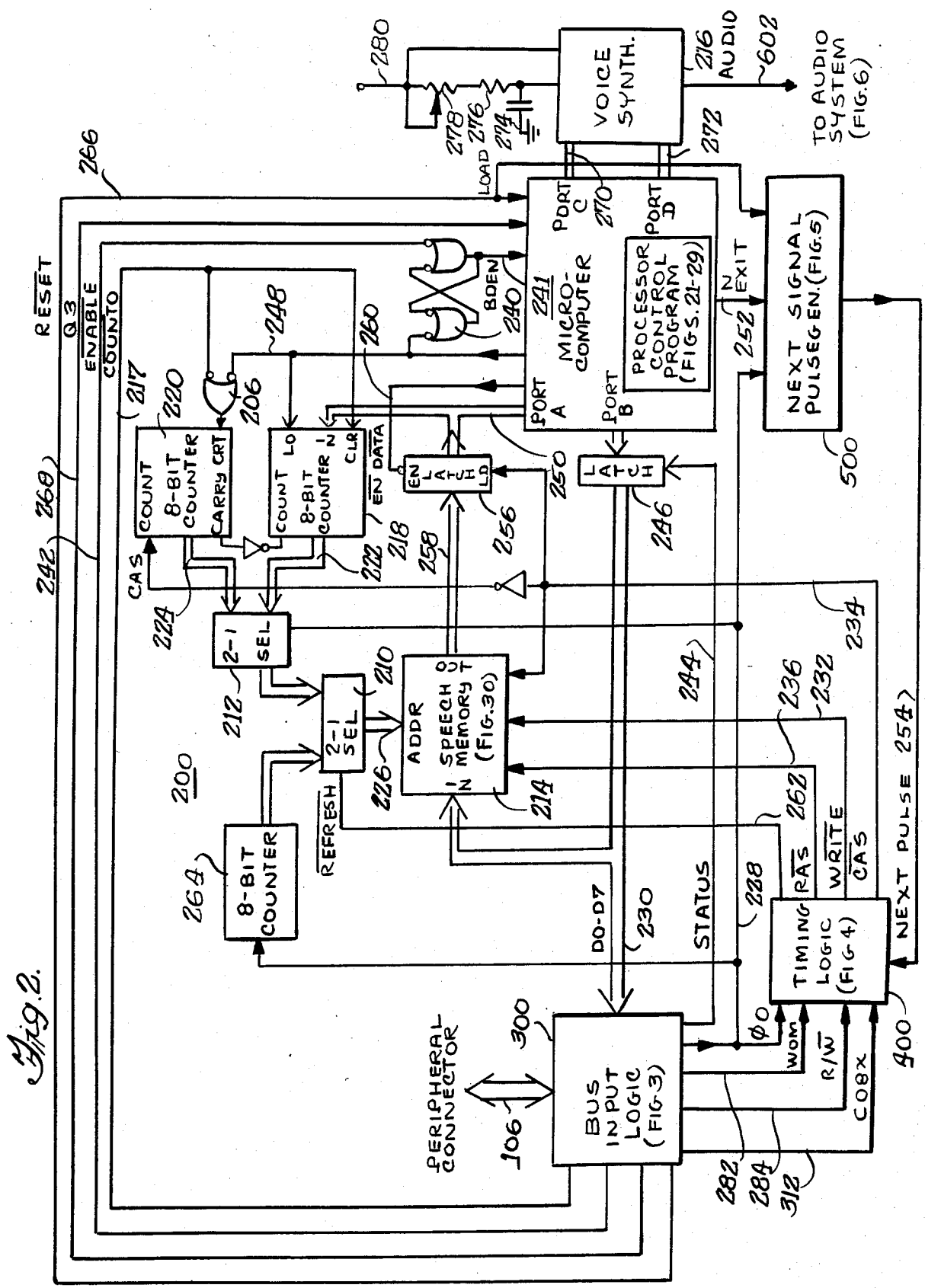
FIG. 2 is a partly block, partly logic, and partly circuit diagram of a speech processor 200 that is a part of the speech system 100.

With reference to FIG. 2, an overview of the speech processor 200 is presented. At the heart of the speech processor 200 lies a microcomputer 202 which generates the control signals that control the operation of the speech processor 200. The microcomputer 202 preferably is a Rockwell International Corporation R6500/1 Microcomputer System, the details of which are described in a publication dated June 1979, entitled "Document No. 29650-N48: R6500 Microcomputer System PRODUCT DESCRIPTION R6501/1 ONE-CHIP MICROCOMPUTER" published by Rockwell International Corporation. The speech processor 200 also contains a speech memory 214 which is a 64K byte random access memory device constructed from up to eight 64K bit dynamic random access memory units No. TMS4164 manufactured by Texas Instruments, Incorporated. In addition, the speech processor 200 contains a voice synthesizer chip 216, Model TMS 5220 also manufactured by Texas Instruments, Incorporated. The voice synthesizer chip 216 is fully described in the Texas Instruments publication DM-02 dated June 1981 and entitled "TMS 5220 Voice Synthesis Processor Data Manual."

The speech memory 214 is first loaded with speech data by the computer 102. The memory 214 has the capacity to hold about five minutes worth of speech which may be broken up into up to 608 discrete speech data segments. To load the memory 214 with speech data, the computer 102 first generates the necessary peripheral connector 106 signals to cause bus input logic 300 to generate a COUNT O signal 217. This signal 217 resets an 8-bit counter 218 to a zero count and also passes through a gate 206 and resets the 8-bit counter 220 to zero count. The outputs 222 and 224 of these two counters are alternately connected by the 2-1 select logic 212 and by the 2-1 select logic 210 to the ADDR input 226 of the speech memory 214. The 2-1 select logic 212 is driven by the PHASE O timing signal (see timing diagram FIG. 9) into alternate states at a rapid rate in order to present a complete 16-bit memory address to the speech memory 214 once during each complete cycle of the PHASE O signal 228. Accordingly, the counters 218 and 220 determine which location within the memory 214 is to be accessed, and the COUNT O signal 217 has forced these counters to address the location $0000 (Note: Throughout this description, a dollar sign signals a hexadecimal number).

Having set the address counters for the speech memory 214 to zero count, the computer 102 may now proceed to write data into successive locations within the speech memory 214. The computer 102 presents the data, one byte at a time, to the peripheral connector 106 data leads D0-D7 230 and simultaneously generates the necessary signals to cause the bus input logic 300 and timing logic 400 to generate a WRITE signal 232 (that enables the speech memory 214 to accept new data) and a CAS signal 234. The CAS signal 234 and an immediately preceding RAS periodic timing signal 236 cause the speech memory 214 to accept a byte of data from D0-D7 230 and to store this byte in location $0000. The CAS signal 234 also advances the 8-bit counter 220 so it now contains a $0001.

The above process is repeated until all the necesary data (up to 64K bytes) has been loaded into the speech memory by the computer 102. Each time a new byte is presented, the CAS, RAS, and WRITE signals 234, 236, and 232 load the byte into the speech memory 214, and the CAS signal adds one to the address count presented by the counters 218 and 220 (which are interconnected such that overflow or carry output from the counter 220 flows into the count input of the counter 218 through a gate 238). The computer 102 may thus load speech data into the speech memory 214 just about as rapidly as it can load data into its own internal memory.

Within the speech memory 214, the speech data is organized as illustrated in FIG. 30. The variable-length speech data segments, each containing whatever data is required to cause the voice synthesizer to generate a voice message, are stored one after another in the locations beginning at $0540 and extending to the end of the memory (or to the end of the speech data). For each such segment, the two-byte address of the location in the speech memory where that segment begins is stored in any one of the pairs of locations within the range labeled vectors to speech data 3004.

The segment address, for example the one stored at 3005 (FIG. 30), of a speech data segment is the displacement (or index) away from memory location $0080 of the vector for that segment divided by two. Hence, the segment address for the phrase whose vector (or starting address) is stored in the locations $0082 and $0083 is $1; the segment address for the phrase whose vector (or starting address) is stored in the locations $0084 and $0085 is $2; and so on. Hence, a segment address is a number between $0 and $25F that can be used to identify a specific phrase. When doubled and added to $0080, and phrase address becomes the address of the location where the address of the start of the phrase is stored within the speech memory 214.

The first two locations $0000 and $0001 within the speech memory 214 comprise the single command location 3006. Whenever the computer 102 wishes to have the speech processor 200 produce speech, the computer 102 proceeds as described above and causes the speech address counters 218 and 220 to be set to zero count. Next, the computer 102 feeds two bytes of data into these first two locations in the manner described above. Then the computer 102 actuates the signals from peripheral connector 106 in such a manner as to cause the bus input logic 300 to generate an ENABLE signal 242 which sets a bistable 240 and causes the bistable 240 to generate a BDEN signal which places the microcomputer 202 into operation. As will be explained below, the microcomputer 202 then examines the contents of the single command 3006 location and takes whatever action the computer 102 has called for.

A number of command options are available. The simplest command that the processor 102 can place into the single command 3006 location is a segment address 3005. Upon receiving a segment address as a command, the microcomputer 202 causes the voice synthesizer 216 to generate the corresponding segment as speech.

If the command supplied is a number within the range of $0800 to $083F, the command informs the microcomputer 202 that a multiple series of commands have been placed in the multiple commands portion 3008 of the speech memory 214. The least significant six bits of the number supplied indicates how many commands have been placed in sequential memory locations $0002 through to the end of the multiple command set. The individual commands within this set may be segment address commands or silent interval commands or both.

If a command stored either in the single command region 3006 or multiple commands region 3008 falls within the numeric range $C000 to $FFFF, the command is a time delay command that orders the speech processor to do nothing for a predetermined number of 12.5 millisecond time internals specified by the least significant 14 bits of the command.

The computer 102 can, by proper manipulation of the peripheral connector 106 control signals, cause a STATUS signal 244 to be generated by the bus input logic 300 which causes status data presented at Port B of the microcomputer 202 to be gated through a gate 246 and presented to the data bus D0-D7 230 from which the status data may be read by the computer 102. This data can indicate, for example, whether the microcomputer 202 is busy generating speech or otherwise executing a series of commands. A special number presented to the computer 102 on some of the leads D0-D7 230 can identify the speech processor to assist the computer 102 when searching the peripheral connector 106 slots for the speech processor 200. Other status leads can indicate such things as the size of the speech memory, if it is variable in size.

Once placed into operation by the BDEN signal 241, the microcomputer 202 generates a LOAD signal 248 that resets the bistable 240, flows through the gate 206 to clear the counter 220, and flows to the LD (Load) input of the counter 218 thereby causing the counter 218 to load itself with the number 250 presented at Port A of the microcomputer 202. At this time, Port A presents $0000 to the counter 218. Accordingly, the two counters are cleared to zero count so they address the single command 3006 data in location $0000 of the memory 214.

Next, the microcomputer generates a NEXT signal 252 which the NEXT signal pulse generator 500 converts into a carefully synchronized NEXT PULSE 254. The NEXT PULSE flows into the timing logic 400 and initiates an RAS 236 and CAS 234 signal sequence that transfers the contents of location $0000 within the speech memory into the latch 256 over the memory output bus 258 and that advances the counter 220 to a count of $0001 so the counters 218 and 220 now address location $0001.

The microprocessor then terminates the NEXT signal 252 and initiates an EN DATA signal 260 that displays the contents of the latch 256 to the bus 250 and to Port A of the microcomputer 202. The microcomputer then accepts the byte of data from the bus 250. Immediately thereafter, the microcomputer 202 again generates the NEXT and EN DATA signals in rapid sequence and thereby reads a second byte of data from location $0001 within the speech memory 214, leaving the counters 218 and 220 addressing memory location $0002.

The microprocessor 202 next examines the 16-bit command it has retrieved from the speech memory and takes whatever action is appropriate, as is explained more fully below. If the address counters 218 and 220 need to be reset to point to a specific address, the microcomputer 204 presents the most significant byte of the desired address to the counter 218 over the bus 250 extending from Port A, and then it generates the LOAD signal to clear the counter 220 and load the most significant byte of the address into counter 218. Then, if the least significant byte of the desired address is non-zero, the microcomputer 202 generates the NEXT signal 252 a number of times equal to the numeric value of the least significant byte. Since each NEXT signal causes the timing logic 400 to generate a CAS signal 234 which advances the counter 220, the net effect of these operations is to set the counters 218 and 220 to the desired address value. By then generating the NEXT signal 252 and the EN DATA signal 260 in alternate sequence, the microcomputer 202 can step through and examine the contents of the speech memory locations starting with the specified address.

The microcomputer 202 maintains its status at port B where it is available to the computer 102, including one data bit that indicates whether the microcomputer is "BUSY."

Since the speech memory 214 is dynamic, it must be "refreshed" periodically to keep it from losing data. At times when the speech processor 200 and computer 102 are otherwise not using the memory 214, a REFRESH signal 262 connects the address input of the speech memory 214 to an 8-bit counter 264 that counts upwards continuously in synchronism with the PHASE O signal 228. The RAS signal 236 continuously pulses the memory 214 even in the absence of the CAS signal and thereby causes locations within the speech memory 214 to be addressed by the count output of the counter 264.

The RESET signal 266 from the computer 102 is applied to the microcomputer 202 and the next signal pulse generator to reset these devices whenever the computer 102 is reset.

The Q3 signal 268 is an asymmetrical timing signal from the computer 102 that is fed into the microcomputer 202 to serve as a clock signal and to synchronize the operation of the computer 202 with the operation of the speech memory 214, which derives its timing from the PHASE O signal 228 in the computer 102. The timing relationship of the Q3 signal 268 and the PHASE O signal 228 is illustrated on page 91 of the "Apple II Reference Manual" book mentioned above. The Q3 signal fluctuates at precisely twice the frequency of the PHASE O signal, going high for 300 nanoseconds each half cycle of the PHASE O signal.

The Q3 signal 268 is applied to input pin 10 of the microcomputer 202, and the RESET signal 266 is applied to pin 39. The remaining four signals shown in FIG. 2 connect to bit positions in port C of the microprocessor 202 as follows:

| Signal Name | Ref. No. | Port C Bit Pos. |
|---|---|---|
| NEXT | 252 | 6 |
| EN DATA | 260 | 3 |
| LOAD | 248 | 1 |
| BDEN | 241 | 0 |

The remaining four Port C signals are connected to the voice synthesizer 216 by a bus 270, and are connected as follows:

| Signal Name | Port C Bit Pos. |
|---|---|
| RDY | 7 |
| INT | 6 |
| RS | 4 |
| WS | 2 |

Port D, bits 0–7, connect respectively to the speech synthesizer 216 input leads which Texas Instruments has labeled "D7" through "D0". This connection is established by a Bus 272. A 50 picofarad capacitor 274 connects the OSC lead of the synthesizer to ground, and 68,000 ohm resistor 276 and 50,000 ohm variable resistor 278 connect this same lead to a negative 5 volt supply 280 which also connects to the voice synthesizer. While the connections are not shown, all the logic elements in FIG. 2 connect to a positive 5 volt supply and to ground.

The Bus Input Logic 300

Figure 3:
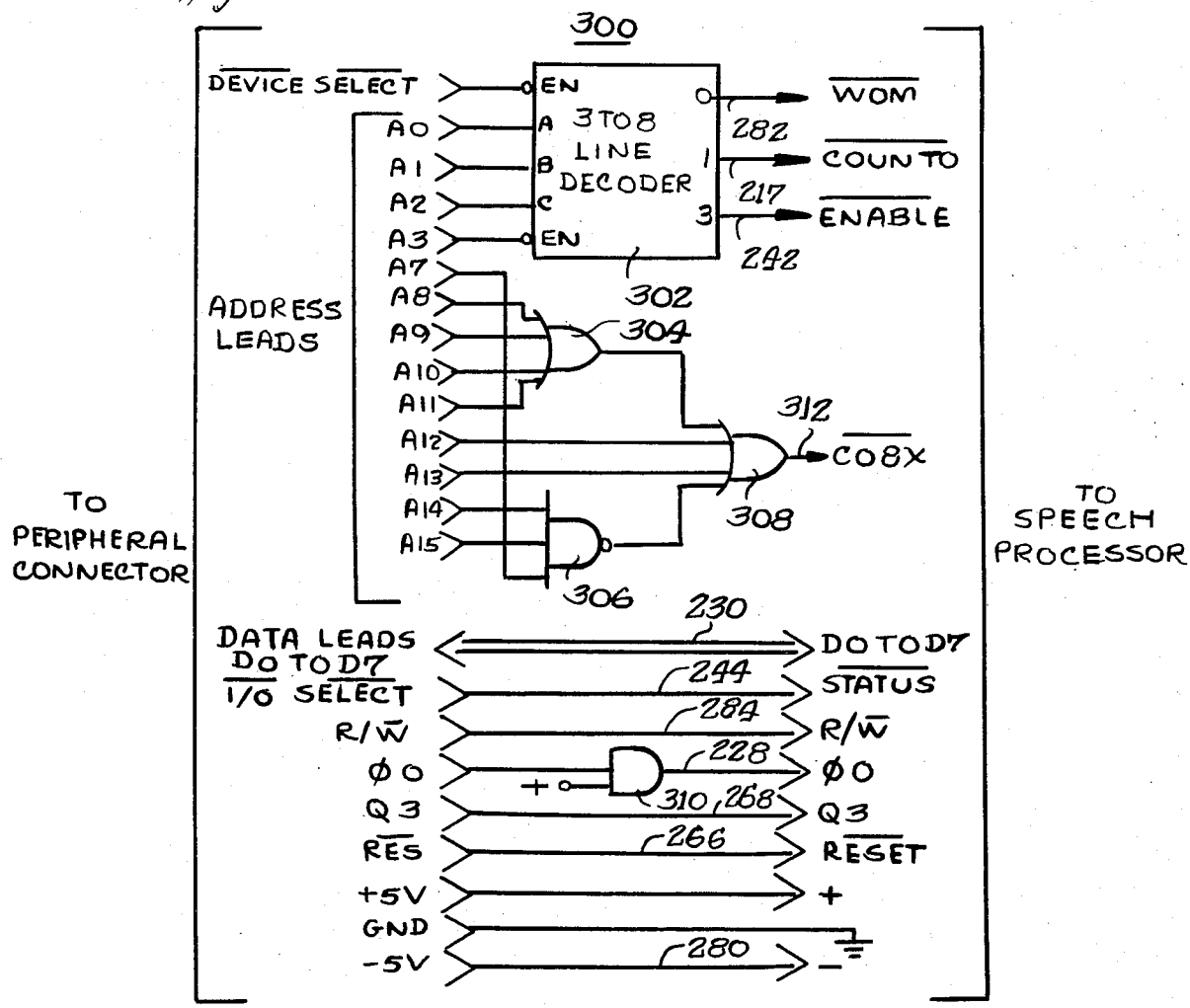
FIG. 3 is a logic diagram of a bus input logic 300 element of the speech processor 200.

FIG. 3 contains the logic that decodes the signals presented by the peripheral connector 106 and generates the control signals that establish communication between the computer 102 and the speech processor 200.

The signals shown in the lower half of the figure do not require decoding. Only the PHASE O timing signal 228 is passed through a buffering gate 310 so that the peripheral connector is not unduly loaded.

Peripheral connector 106 address leads A7 through A15 are decoded by gates 304, 306, and 308 such that a signal CO8X 312 appears whenever the binary address "1100 0000 1xxx xxxx" (where x may be "0" or "1") is applied to the peripheral connector address leads. With reference to FIG. 4, the signal CO8X 312 passes through a gate 404 and becomes the REFRESH signal 262 that causes the 2-1 select 210 to disconnect the refresh 8-bit counter 264 from the speech memory 214 and connect it instead to the counters 218 and 220 whenever the computer 102 may be attempting to feed data into the speed memory 214.

The peripheral connector DEVICE SELECT signal, which selects a peripheral port whenever the computer 102 addresses locations between $CON0 and $CONF (where N is the peripheral connector port number), enables a 3 to 8 line decoder 302 to decode address lines A0, A1, A2, and A3 into the three control signals WOM 282 (generated by address $CON0), COUNT O 217 (generated by address $CON1), and ENABLE 242 (generated by address $CON3).

Timing Logic 400

Figure 9:
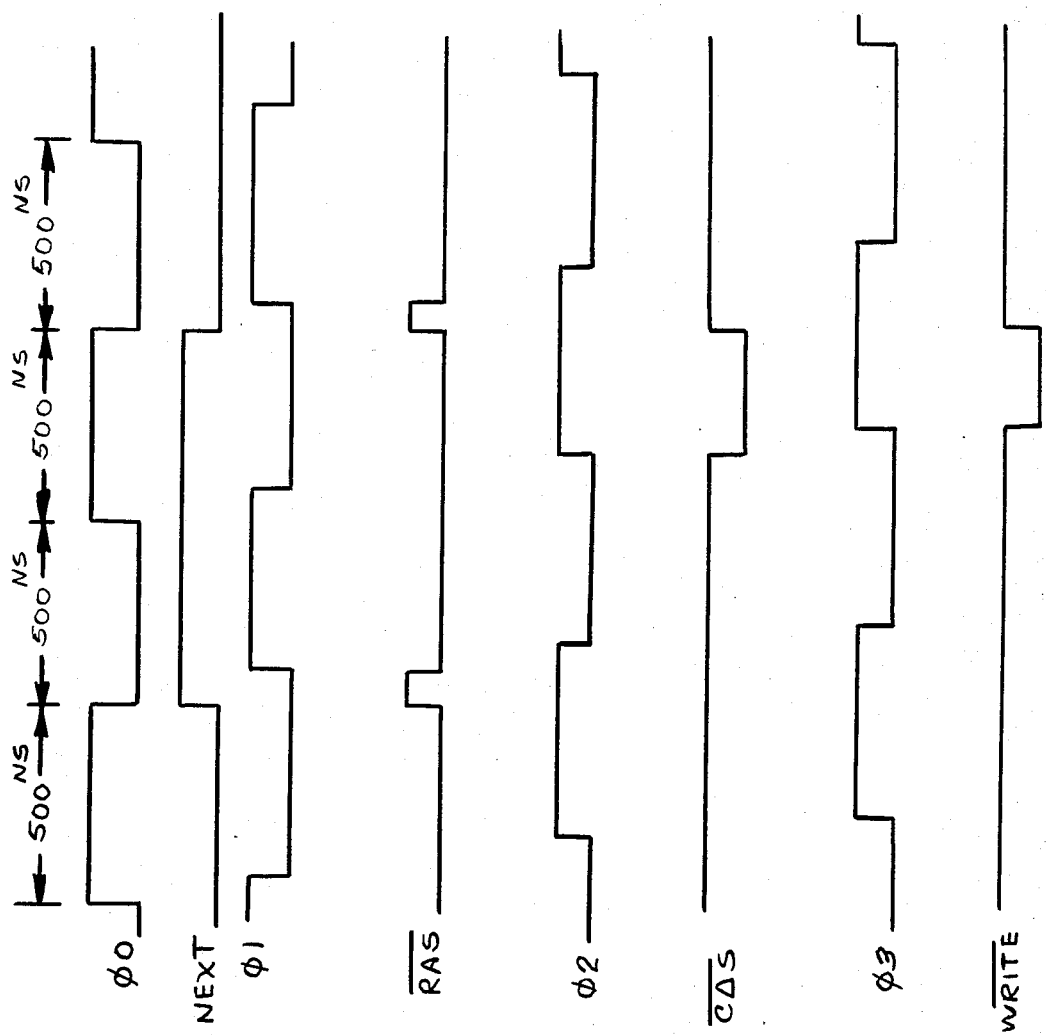
FIG. 9 is a timing diagram illustrating the timing relationships of signals in FIGS. 4 and 5.

With reference to FIGS. 4 and 9, the speech system 200 timing signals that govern the operation of the speech memory 214 are generated by the timing logic 400. The Phase O timing signal 228 from the computer 102 is fed through a series of three inverting time delay networks 406, 408, and 410. The first inverting time delay network 406 feeds the PHASE O signal 278 through 1,000 ohm resistor 412 and a 180 picofarad capacitor 414 to ground. The delayed PHASE O pulse at the node 416, where elements 412 and 414 join, is inverted and squared up by passage through a gate 418 to become a PHASE 1 signal 420, as shown in FIG. 9. In a similar manner, the PHASE 1 signal 420 is fed through inverting time delay networks 408 and 410 to become the PHASE 2 signal 422 and the PHASE 3 signal 424 whose timing relationships to the PHASE 1 signal 420 is shown in FIG. 9. The network 408 includes a 1,000 ohm resistor 426 and a 150 picofarad capacitor 428, while the network 410 includes a 1,000 ohm resistor 430 and a 100 picofarad capacitor 432.

With reference to FIG. 2, the PHASE O signal 228 controls the 2-1 select 212 that alternately couples the counters 218 and 220 to the speech memory 214 address input. When the PHASE O signal 228 is low, a RAS signal 236 pulse loads one of the two counter's address signals into the memory 214. When the PHASE O signal 228 is high, a CAS signal 234 pulse loads the other counter's address signals into the memory 214. The CAS signal 234 then advances the counter 220 so that the next sequential location in the memory 214 is addressed during the next PHASE O timing cycle.

Of course, the above sequence of operations assumes that either the computer 102 or the microprocessor 101 is accessing the memory 214, so that its address signals are derived from the counters 218 and 220 and the CAS signal 234 is generated. At other times, the CAS signal does not arise, and the RAS signal actuates the memory 214 to accept data from the refresh counter 264.

Referring once again to FIGS. 4 and 9, the RAS signal 236 is formed by passing both the PHASE O and PHASE 1 signals through a gate 434 at whose output a signal appears whenever either of these two signals is present. The absence of an output from the gate 434 is defined to be the presence of the inverted RAS signal 236 which goes high momentarily whenever the PHASE O signal goes low and then drops when the PHASE 1 signal goes high.

The gate 436 prevents the CAS signal 234 from arising except when the PHASE O and PHASE 2 signals are both high. Accordingly, the CAS signal can only arise towards the middle of the period when the PHASE O signal is high, and the CAS signal terminates (and advances the counter 220 in FIG. 2) in synchronism with the termination of the PHASE O signal 228. The CAS signal arises from either the WOM signal 282 or the NEXT PULSE signal 254 flowing through the combining gate 438 and the blocking gate 436, and these respectively arise when the computer 102 (which generates the WOM signal) or the microcomputer 202 (which generates the NEXT PULSE signal) attempt to access the speech memory 214.

The signal R/W 284 from the peripheral connector, which distinguishes a data read request from a data write request, is passed through a blocking gate 402 to become the WRITE signal 232 that enables the speech memory 214 to accept new data. The timing of the WRITE signal 232 is adjusted so that it is, in effect, a CAS signal whose onset is delayed slightly to coincide with the time when the computer 102 presents data to the data bus D0-D7 230. The CAS signal 234 is passed through a gate 440 that is disabled at the onset of the CAS signal by the delayed onset of the PHASE 3 signal 424. The delayed-onset CAS signal 442 that flows from the gate 440 is fed into the gate 402 to determine the timing of the WRITE signal. The gate 402 blocks the signal R/W from becoming the WRITE signal 232 whenever the NEXT PULSE signal 254 signals that the microprocessor 202 is reading data out of the memory. The gate 402 also blocks the signal R/W whenever the WOM signal 282 is absent, since memory WRITE cycles are signaled by the WOM signal 282.

Next Signal Pulse Generator 500

The NEXT signal 252 generated by the microprocessor must be converted into a carefully timed NEXT PULSE 254 (FIGS. 2, 5 and 9), and this conversion is carried out by the pulse generator 500. The NEXT signal 252 leading edge sets a JK master-slave flip flop 502 whose Q output 506 enables the J input of a second JK master-slave flip flop 504. The next trailing edge of a PHASE O signal 228 toggles the flip flop 504, and it initiates the NEXT PULSE signal at 254. One PHASE O cycle later, the NEXT trailing edge of a PHASE O signal 228 clears the flip flop 504 and terminates the NEXT PULSE signal 254. A 510 picofarad capacitor 508 feeds the trailing edge of the NEXT PULSE signal 254 back to the inverted clear terminal of the flip-flop 502 which is connected to ground and +5 volts by a pair of 1,000 ohm resistors 510 and 512. The circuit thereby resets itself and awaits the next NEXT signal 252.

Audio System 600

The audio system 600 is a conventional audio amplifier that accepts the AUDIO signal 602, adjusts its level, filters it, amplifies, and applies it to a loudspeaker 604.

While the preferred embodiment of the invention has been described, it will be understood by those skilled in the art that numerous modifications and changes can be made without departing from the spirit of the invention. The claims that follow are intended to define the true spirit and scope of the invention.

The AUDIO signal 602 is first applied across 1,000 ohm resistor 606 and a 10,000 ohm potentiometer 608 connected in parallel to ground. A 0.1 microfarad capacitor 610 connects the slider 612 of the potentiometer 608 to a 4-pole active filter 614 having a 4,000 Hz low-pass cutoff characteristic. The filter 614 connects to the input lead 6 of an integrated circuit audio amplifier 622. A feed back network comprising a 100,000 ohm resistor 620 connected in parallel with a 510 picofarad capacitor 630 connect pins 2 and 6 of the amplifier 622 together. Pin 1 is connected to ground by a 5 microfarad capacitor 632, and a 100 microfarad capacitor connects the amplifier 622 output pin 8 to the speaker 604 which has its other lead connected to ground. The amplifier 622 is a National Semiconductor No. LM380 audio amplifier.

Figure 7:
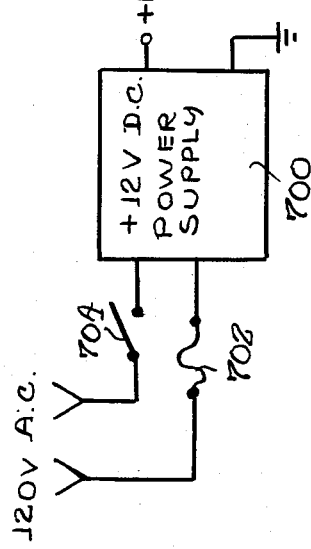
FIG. 7 is a partly circuit and partly block diagram of a +12 volt power supply 700 for the audio system 600.
Figure 8:
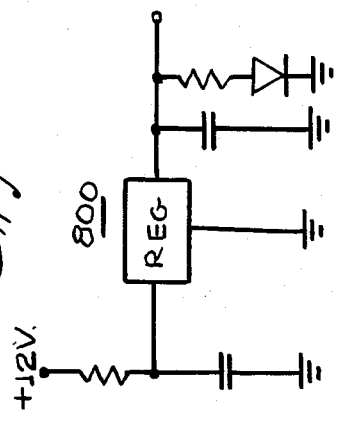
FIG. 8 is a partly circuit and partly block diagram of a +5 volt power supply 800 for the speech processor 200.

Twelve volts of power for the audio amplifier 622 is provided by at 2 volt D.C. power supply 700 shown in FIG. 7 connected by a fuse 702 and an "off-on" switch 704 to a 120 volt source of A.C. power 706. The power supply 700 is conventional. Optionally, the +12 volt power supply 700 can power a regulated at +5 volt power supply 800 shown in FIG. 8 which can feed at +5 volt power back to the speech processor 200 (FIG. 2) to reduce or eliminate the drain on the power supply of the computer 102. The regulated at +5 volt power supply is conventional.

The AUDIO signal 602 is first applied across 1,000 ohm resistor 606 and a 10,000 ohm potentiometer 608 connected in parallel to ground. A 0.1 microfarad capacitor 610 connects the slider 612 of the potentiometer 608 to a 4-pole active filter 614 having a 4,000 Hz low-pass cutoff characteristic. The filter 614 connects to the input lead 6 of an integrated circuit audio amplifier 622. A network comprising a 100,000 ohm resistor 620 connected in parallel with a 510 picofarad capacitor 630 connects pins 2 and 6 of the amplifier 622 together. Pin 1 is connected to ground by a 5 microfarad capacitor 632, and a 100 microfarad capacitor connects the amplifier 622 output pin 8 to the speaker 604 which has its other lead connected to ground. The amplifier 622 is a National Semiconductor No. LM380 audio amplifier.

Twelve volts of power for the audio amplifier 622 is provided by at 12 volt D.C. power supply 700 shown in FIG. 7 that is connected by a fuse 702 and an "off-on" switch 704 to a 120 volt source of A.C. power 706. The power supply 700 is conventional. Optionally, the +12 volt power supply 700 can power a regulated +5 volt power supply 800 shown in FIG. 8 which can feed +5 volt power back to the speech processor 200 (FIG. 2) to reduce or eliminate the drain on the power supply of the computer 102. The regulated +5 volt power supply is conventional.

DESCRIPTION OF THE PROGRAMMED PORTIONS OF THE SYSTEM

Processor Control Program 204

In FIG. 2, the microcomputer 202 is shown containing a processor control program 204 which controls its operations. FIGS. 22 to 29 constitute a complete flow diagram of the program logic of the control program 204. These flow diagrams are explained below.

The SCAN routine

With reference to FIG. 22, after performing certain housekeeping functions at 2202 to initialize the speech processor 200, program execution commences at SCAN and thereafter periodically returns to SCAN when all other tasks are finished.

The microcomputer begins at 2204 by generating a momentary LOAD signal 248 to reset the bistable 240 and load or clear the speech memory address counters 218 and 220. The microcomputer then clears the "busy" bit of its status word at Port B and enters into a loop at 2208 and 2210 where it repeatedly tests for the presence of a BDEN signal 241, indicating the computer 102 has set the bistable 240 and wishes some task performed.

At 2212 the microcomputer sets the port B "busy" bit, and at 2214 it fetches the two byte command from addresses $0000 and $0001 of the speech memory 214. If the command is a number less than or equal to $25F, it is a phrase segment address—a simple request to have a particular speech segment reproduced. Detecting this at 2216, the microcomputer stores zero in location PHRASE to indicate the phrase segment address is stored in speech memory location $0000, and it stores a 1 in location PHRASES, since this is the number of phrases to be reproduced. Program control then continues at SPEECH in FIG. 20.

If it is not a segment address, the microcomputer checks at 2220 for a request to process a multiple set of commands. The most significant byte of such a command is $80, and the least significant byte is the number of commands (presumably stored sequentially in speech memory locations $0002, $0004, etc.) that are to be executed, up to a maximum of $3F commands. If this is a multiple command processing request, the microcomputer stores the six least significant bits of the command (representing the number of commands to be executed) in location PHRASES and stores a 1 in the location PHRASE to indicate the first command to be executed is in the second 16-bit location of the speech memory (e.g., locations $0002 and $0003). Then program control continues at SPEECH in FIG. 23.

Figure 26:
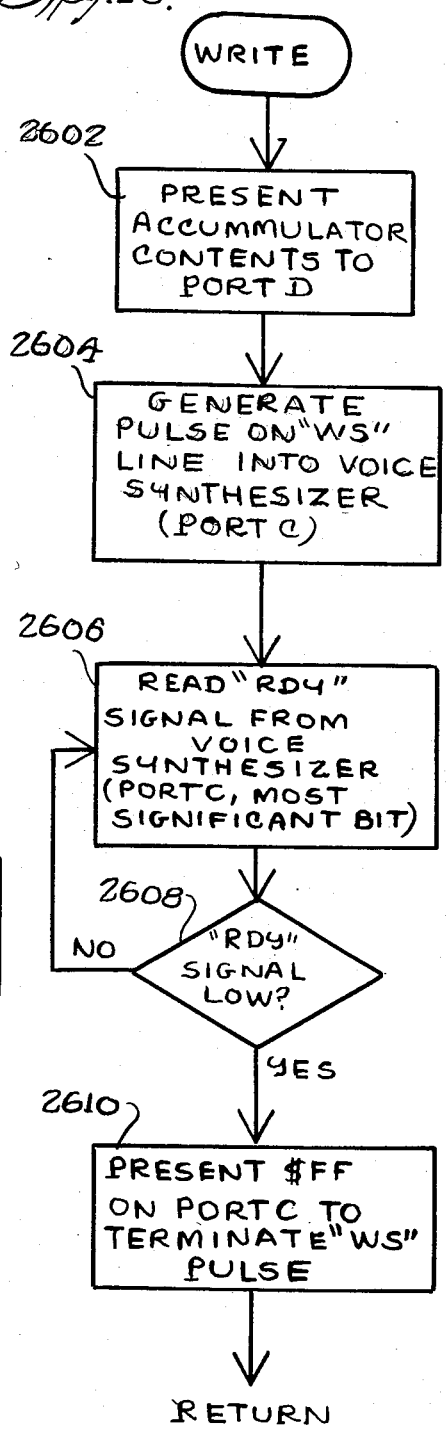
FIG. 26 is a flow diagram of the subroutine WRITE that is called at 2708, 2714, and 2720 in FIG. 27.

If the command being decoded is not a multiple command request, the microcomputer checks at 2224 to see if the two most significant bits are set, indicating this is a time delay or pause request, with the remaining bits indicating the length of the pause measured in 12.5 millisecond intervals. If so, the subroutine DODELAY in FIG. 26 is called at 2226. If not, then an error action is taken at 2228. In either case, program control returns to SCAN where the bistable 240 is cleared and the "busy" bit is also cleared and the microprocessor idles once more awaiting the next ENABLE command 242 from the computer 102.

The Speech Routine

Figure 23:
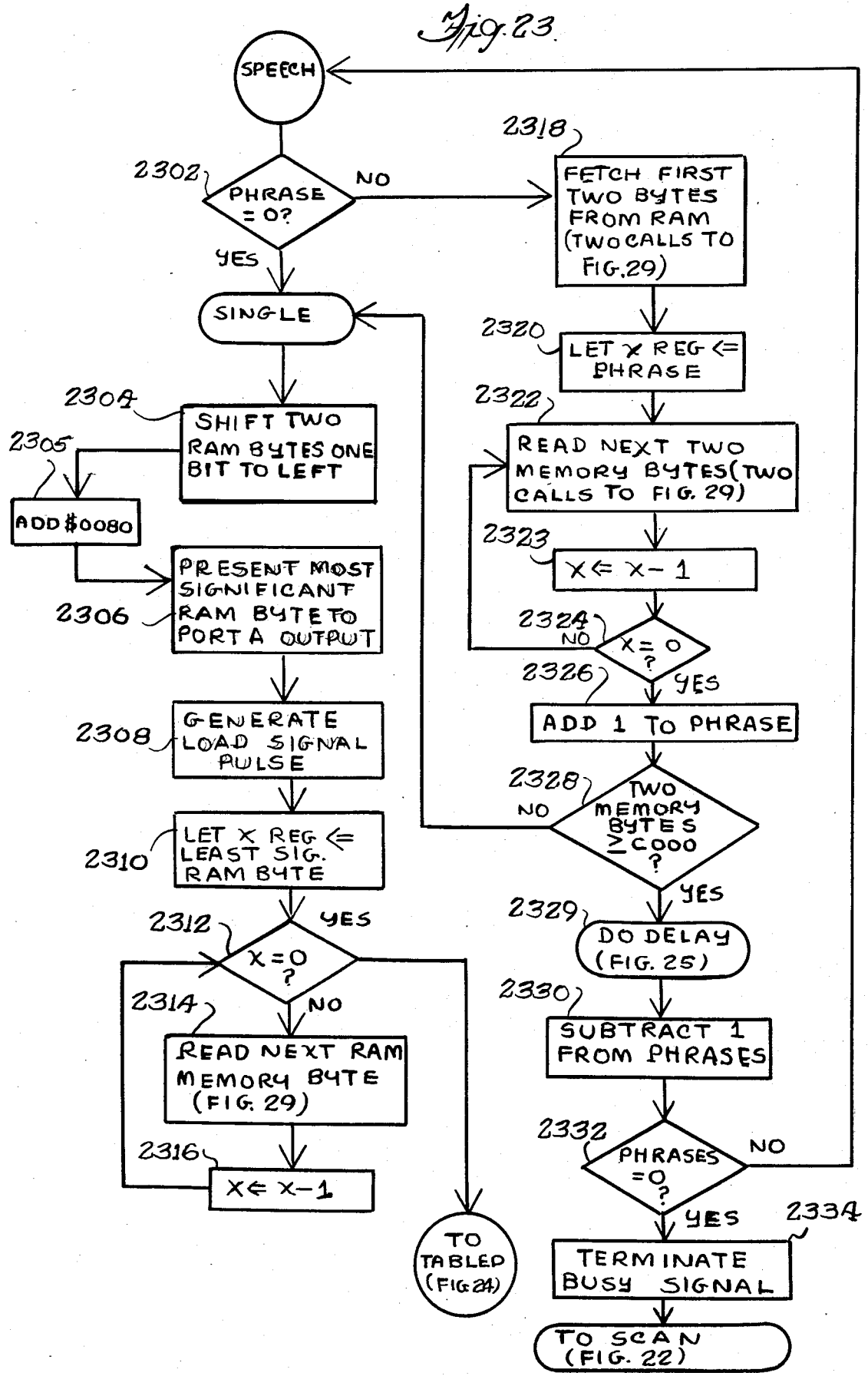
FIG. 23 is a flow diagram of the SPEECH portion of the processor control program 204.

With reference to FIG. 23, the routine SPEECH begins at 2302 by checking to see if a multiple command sequence is being processed. If so, then program control shifts to 2318. The memory address counter is cleared to zero by accessing the first two bytes of data in the speech memory. Then the desired phrase number (the number of the 16-bit location where the next command to be executed is stored) is placed in index register X at 2320. A loop is then entered during each pass of which the next two speech memory bytes are read and index register X is decremented, with the loop (steps 2322, 2323, and 2324) terminating at 2324 when the contents of the index register X equals O and the next command to be executed has been retrieved. "1" is then added to the number in PHRASE so that the next command in the speech memory will be selected the next time.

At 2328, the command just retrieved is tested to see if it is a segment address (less than $C000). If it is, program control continues at SINGLE where single segment address commands are also processed. If a time delay request, the subroutine DODELAY is called at 2329 to process the request. One is substracted from the remaining-to-be-executed command count in location PHRASES (at 2330), and PHRASES is checked to see if it equals zero. If not, program control branches back to SPEECH, and the next command is executed. If no more commands remain the "busy" bit is cleared at 2334, and program control returns to SCAN in FIG. 22 where the microcomputer 202 idles once again.

The SINGLE Routine

If a segment address is to be processed, program control continues at SINGLE with step 2304. First, the segment address is shifted and thereby multiplied by two to convert it into a relative byte address. Then $0080, the base address of the speech data vectors storage area (3004 in FIG. 30), is added to the relative address to produce the two byte absolute address of the two locations containing the starting address of the segment of speech data. At 2306, the most significant address byte is presented to microcomputer Port A for presentation to address counter 218, and at 2308 a LOAD signal is generated to load this byte into counter 218 and to zero counter 220. Now the least significant address byte is placed in index register X, and a loop (2312, 2314, 2316) is entered into during which NEXT signal pulses are generated to increment the counter 220, while the index register X is decremented, until register X contains zero and counter 220 now contains a count value equal to the least significant address byte.

Figure 24:
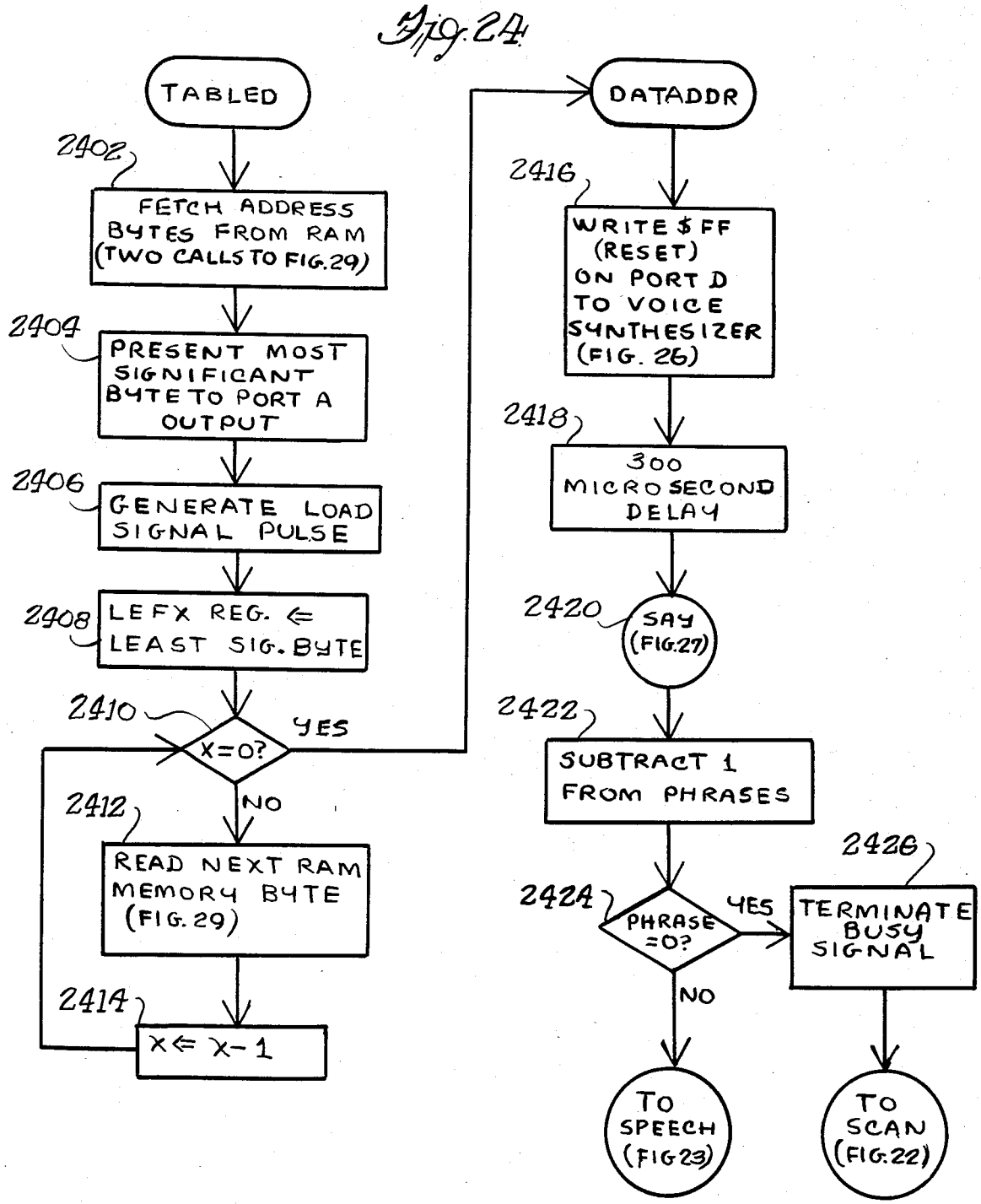
FIG. 24 is a flow diagram of the TABLED portion of the processor control program 204.

Program control continues at TABLED in FIG. 24 where the vector address is retrieved by the generation of two NEXT pulses (step 2402). Now the two bytes are the most and least significant bytes of the actual starting address of the locations containing the speech data. Steps 2404, 2406, 2408, 2410, 2412, and 2414 are now executed in a manner virtually identical to steps 2306 to 2316 just described in the last paragraph, leaving the counters 218 and 220 containing the actual starting address of the speech data when program control continues at DATADDR.

At DATADDR, the microprocessor begins transferring the speech data to the voice synthesizer 216. At 2416, the value $FF is presented to the synthesizer over Port D. Then a 300 microsecond delay is generated at 2418. At 2420, the subroutine SAY (FIG. 27) is called upon to transfer the speech data to the synthesizer. Then, at 2422, 1 is substracted from the number of phrases or commands waiting to be processed. If more remain (2424), then program control returns to SPEECH in FIG. 23, and the next command is processed. If none remain, step 2426 clears the BUSY bit, and program control returns to SCAN in FIG. 22 where the microcomputer idles once again.

Subroutine DODELAY

Figure 25:
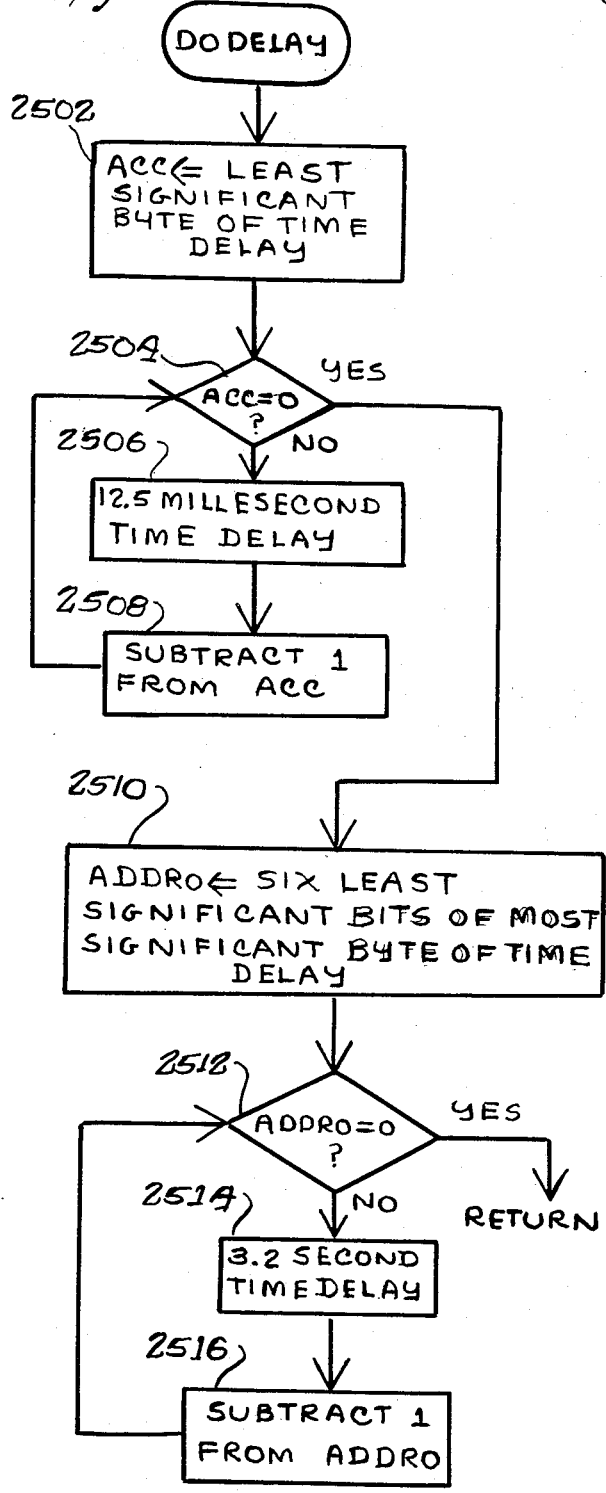
FIG. 25 is a flow diagram of the subroutine DODELAY that is called at 2226 in FIG. 22 and at 2329 in FIG. 23.

The subroutine DODELAY in FIG. 25 causes the speech processor to idle for the number of 12.5 millisecond time intervals indicated by the 14 least significant bytes of the delay command. At 2502, the eight least significant bytes are entered into the microprocessor's accumulator, and then a loop (2504, 2506, 2508) is entered. Within this loop, the accumulator is decremented every 12.5 milliseconds until it equals zero. Next, the least significant bits of the most significant byte are stored in location ADDR0. A loop is then entered (2512, 2514, 2516). Within this loop, the number in location ADDR0 is decremented every 3.2 seconds until it becomes zero.

Subroutine SAY

Figure 27:
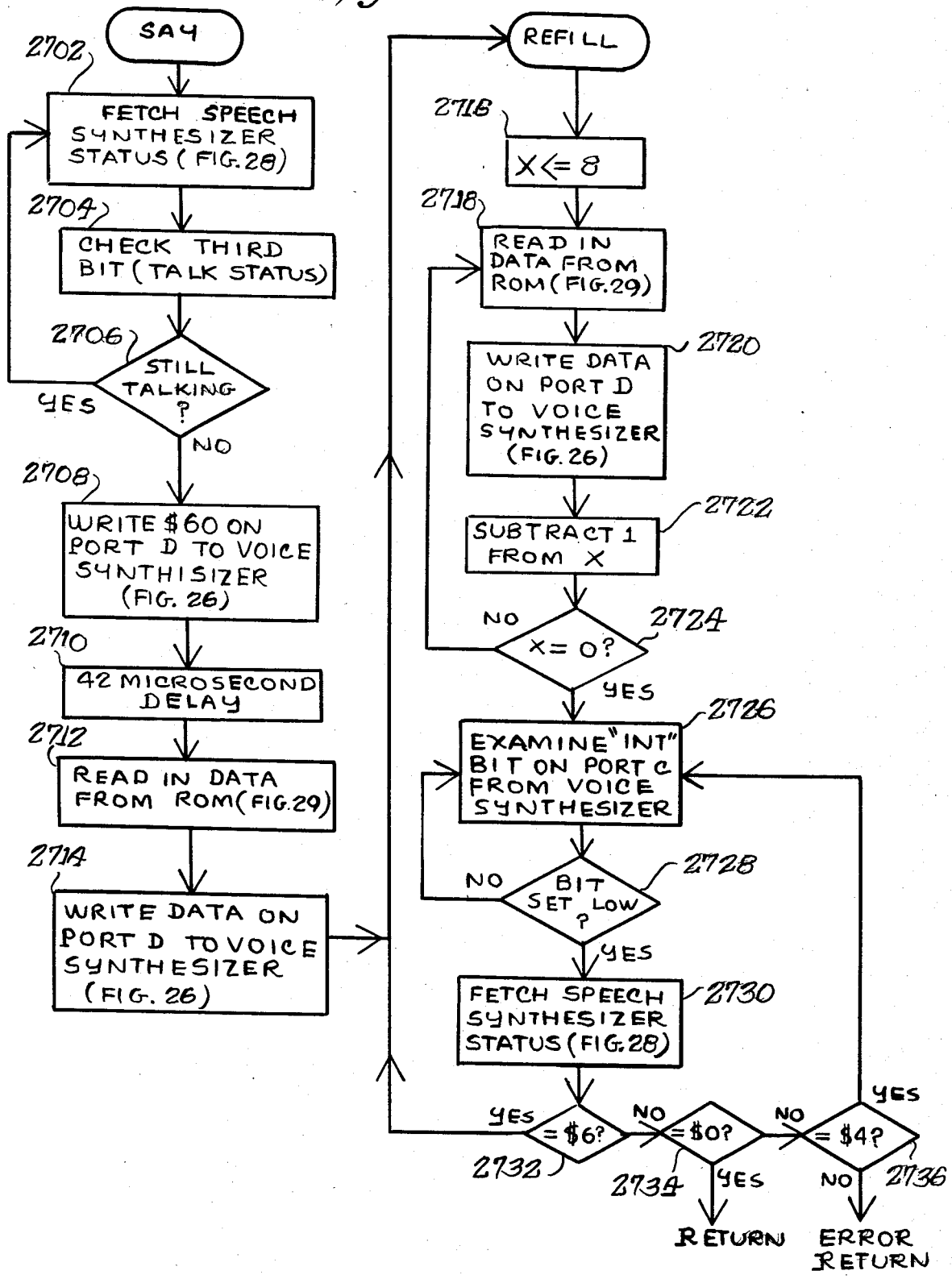
FIG. 27 is a flow diagram of the subroutine SAY that is called at 2420 in FIG. 24.

FIG. 27 presents the subroutine SAY that transfers data from the speech memory 214 to the voice synthesizer 216 until an entire phrase has been transferred. A loop (2702, 2704, 2706) is entered into during which the synthesizer status bits are retrieved and the talk status bit is checked over and over until it is cleared. At step 2708, a command $06 is presented to the synthesizer over Port D of the microprocessor. After a 42 microsecond delay (2710), a byte of data is transferred from the speech memory 214 to the voice synthesizer 216 (steps 2712 and 2714). Program control then continues at REFILL.

At 2716, the value "8" is placed into the index register X to serve as a loop counter. Then a loop is entered into (2718, 2720, 2722, 2724). During eight passes through this loop, eight bytes of data are transferred between the speech memory 214 and the voice synthesizer 216. Index register X is decremented during each pass, and when X contains zero, program control loops at 2726 and 2728 until the INT signal line from the speech processor goes high. Then at 2730 the synthesizer status bits are retrieved and checked. If they equal "6", then program control returns to REFILL, and another 8 bytes of data are transferred. If they equal "4", the loop at 2726 and 2728 is commenced until the next interrupt. If they equal zero, then the speech segment data transfer is done. Any other result causes an error return from the subroutine. The value tests are carried out at 2732, 2734, and 2736.

Subroutine WRITE

The subroutine WRITE in FIG. 26 is called upon by the subroutine SAY in FIG. 27 to transfer a byte of data from the microprocessor to the speech synthesizer. Since the data to be transferred is passed to the subroutine in the accumulator, its contents are presented to Port D, the data lines leading to the synthesizer (step 2602).

The number $FB is applied to Port C to send a W signal to the synthesizer, signaling the data is ready (step 2604). A loop is then entered at 2606–2608 that samples the synthesizer RDY signal until it drops. Then $FF is applied to Port C to terminate the WS signal (2610).

Subroutine STATUS

The STATUS subroutine in FIG. 28 returns in the accumulator three status bits obtained from the synthesizer. At 2802, the number $FF is presented at Port D to the synthesizer data lines. Next at 2804, the value $EF is presented at port C to generate the Synthesizer RS (read select) input signal. At 2806–2808, the system loops whle continuously checking the "RDY" signal bit which is the most significant port C bit. When it goes low, synthesizer status data is read from port D into index register X (2810). $FF is presented to port C to terminate the RS signal (2812). The status data is transferred to the accumulator (2814), right shifted until bits 5, 6 and 7 are bits 0, 1, and 2 (2816), and masked 2818.

Subroutine READMEM

This frequently-called-upon subroutine reads a byte of data from the speech memory 214 and increments the counters 218 and 220. It begins at 2902 by generating the NEXT signal 252 by presenting the number $DF to Port C. At 2904, it terminates the NEXT signal 252 and simultaneously generates an EN DATA signal 260 by presenting the number $F7 to port C. Next at 2906, the microprocessor reads in the byte of memory data presented to port A by the enabled latch 256. Finally at 2908, all signals are terminated by presenting $FF to port C.

Speech Control Program 104

The speech control program 104 is a program within the computer 102 that calls upon the speech processor 200 to generate individual and sets of speech segments and time delays. Clearly, the present invention contemplates the development of many different types of speech control programs, including, for example, computer-aided-instructional programs that do many things in addition to and, perhaps, simultaneously with the generation of speech. All such programs will include program elements that can pass data and commands over the peripheral connector 106 to the speech processor 200 and test the status of the processor 200, particularly whether it is busy. So the speech control program described below is simply one example of how the speech processor 200 can be used in conjunction with the computer 102. The example chosen is a test program used by the developers of this system to emulate the operation of the speech processor 200 by computer-aided-instructional (CAI) programs. Only instead of having actual CAI programs passing commands to the speech processor, the emulation program described below permits a human to type out the number of the command or commands that are to be executed. This emulation program contains all of the "hocks" that any program would need to function as the speech control program element of the present invention, so it serves to illustrate the present invention quite nicely. It is also a relatively simple program.

Main Program Routine

Figure 10:
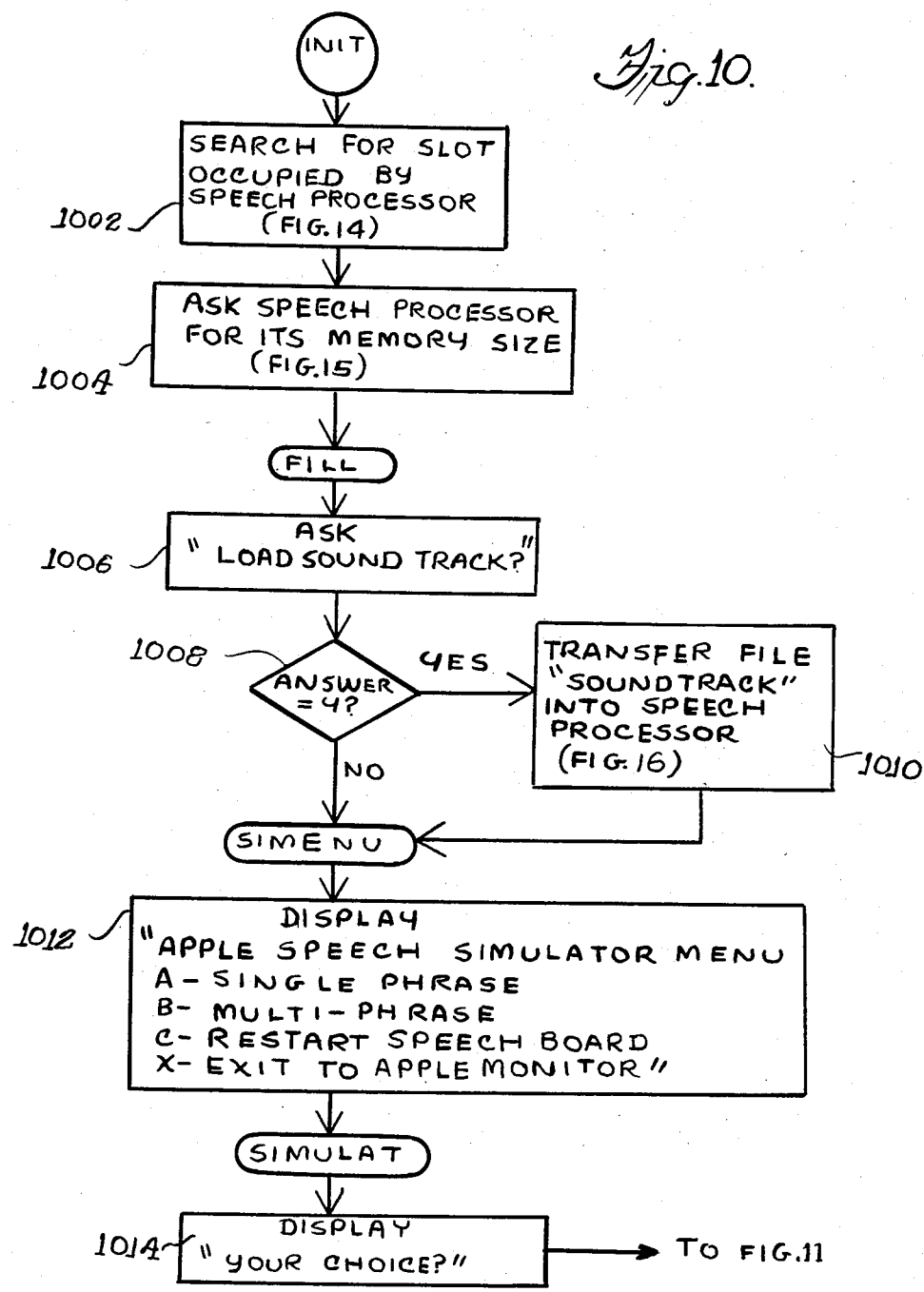
FIGS. 10 and 11 together form a flow diagram of the first half of the main part of the speech control program 104 which controls the programmable digital computer 102 of the digital speech system 100.
Figure 11:
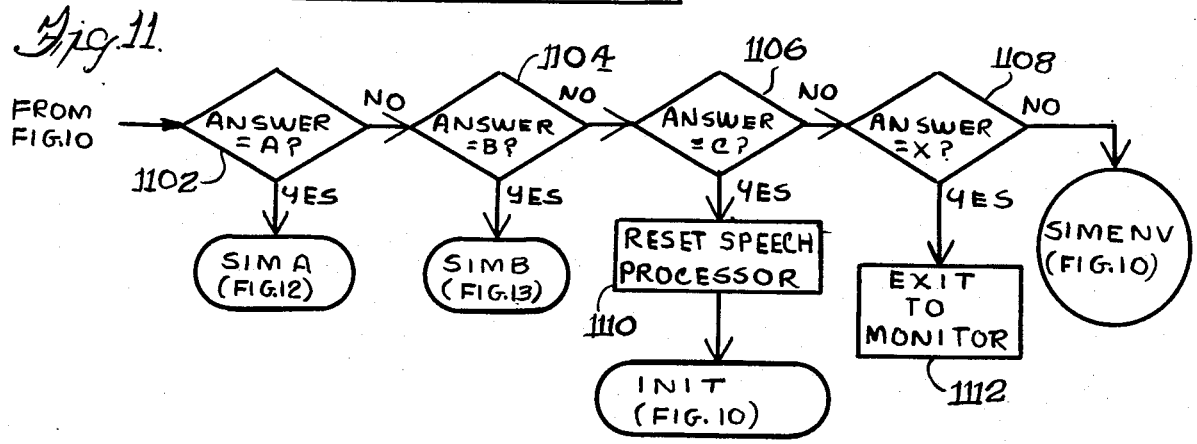

FIGS. 10 and 11 together illustrate the main flow of the speech control program 104. After initializing the system by seeking out the slot in the peripheral connector 106 where the speech processor 200 is stored (at 1002) and determining the size of the speech memory 214, (at 1004) the program at 1006 asks if you wish to have the "soundtrack" or sound data set loaded. If you do, the program at 1010 transfers the sound data set from disk storage into the computer 102 memory and from there into the memory 214, assumedly filling locations $0080 to the end of the memory 3002 or some point short of the end of the memory (See FIG. 30). A frequently used multiple command sequence might be loaded into area 3008 at the same time.

The program at 1012 and 1014 now asks you what you wish to do next. Your answer is analyzed at 1102-1108 in FIG. 11. If you type A, indicating you wish to issue a single command, at 1102, you are routed to the SIMA routine in FIG. 12. If you typed B and thereby select a multiple command set, at 1104 you are routed to SIMB in FIG. 13. If you type C, the speech processor is reset at 1110, and program control returns to the very beginning with the reinitialization of everything at INIT in FIG. 10. If you type X, the program at 1108 returns you to the Apple monitor at 1112. Any other response simply returns program control to SIMENU in FIG. 10 where the same question is repeated.

Sima Routine

Figure 12:
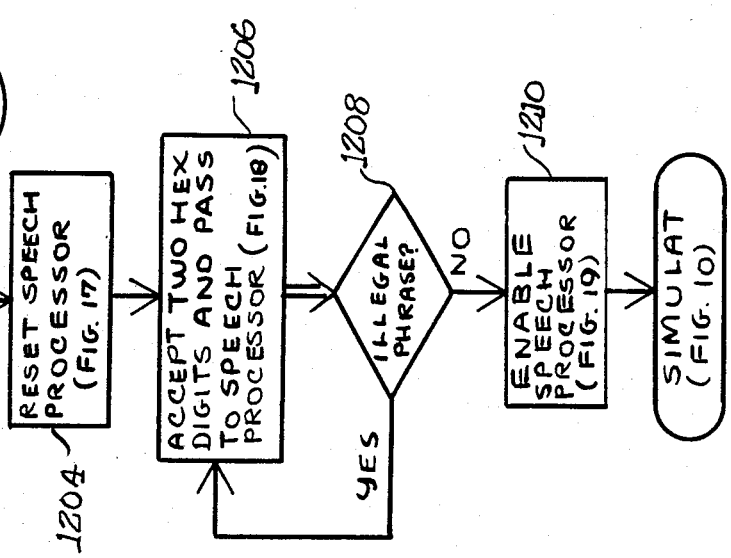
FIG. 12 is a flow diagram of the SIMA portion of the speech control program 104.

FIG. 12 presents the program that lets you simulate the passing of single commands to the speech processor 200. At 1202, the status of the speech processor 200 is checked. If the "busy" bit is set, program control returns to the prompting point SIMULAT in FIG. 10. Otherwise, the speech processor is reset at 1204. Two hexadecimal digits are solicited at 1206 and checked for illegality at 1208. If illegal, they are rejected, and two more digits are requested. Then at 1210 the speech processor is placed into service. Program control then returns to the prompting point SIMULAT in FIG. 10.

Simb Routine

This is the routine that permits you to supply multiple commands to the speech processor 200. It begins at 1302 by checking to see if the speech processor is in use. If not, at 1304 it asks you how many commands (phrases to be spoken and time delays) you wish to submit. The speech processor address counters are then reset to zero at 1306, and $80 is poked into speech memory 214 location $0000 and 1308. At 1310 your answer is accepted and tested at 1312 and 1314 to make sure it falls within the range of 1 to 63 commands.

At 1316, the number of commands is stored in location $0001 of the speech memory 214. Next, a loop encompassing steps 1318, 1320, 1322, and 1324 is entered. During each pass, two phrase or time delay hexadecimal digits are solicited, accepted, checked for errors, and stored in sequentially adjacent locations in the speech memory 214 beginning with location $0002. This process continues until an error transfers program control back to SIMB or until the proper number of phrases and time delays have been provided. Then the speech processor is placed in operation at 1326, and program control returns to the SIMULAT reprompting entry point in FIG. 10.

Miscellaneous Routines

FIGS. 14-16 and 19 disclose some of the more detailed aspects of the interaction between programs in the computer 102 and the speech processor 200.

Figure 14:
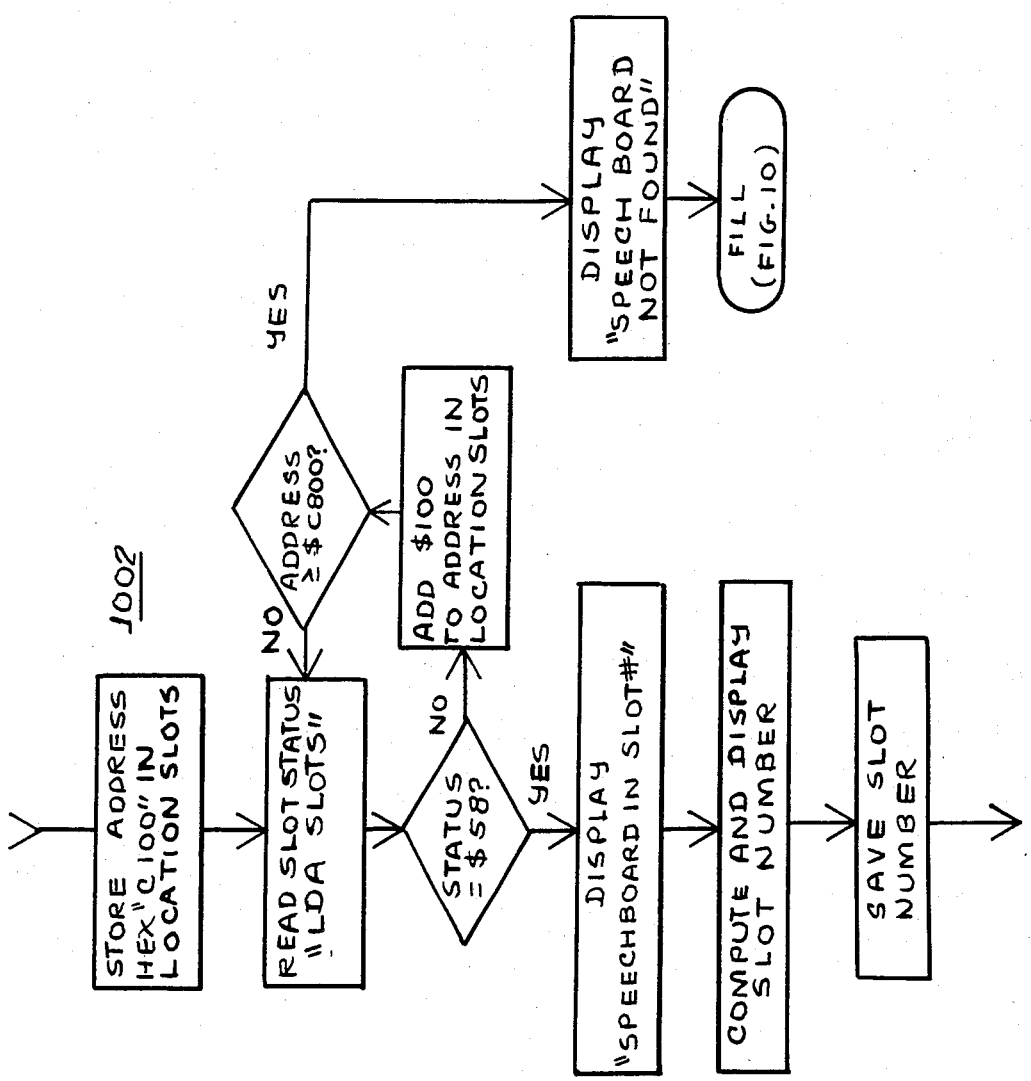
FIG. 14 is a flow diagram of the routine 1002 in FIG. 10.

FIG. 14 describes a routine 1002 that searches for a peripheral connector 106 slot address from which the speech processor 200's identifying code $5B can be retrieved. This routine 1002 is part of the initialization routine INIT at the top of FIG. 10.

FIG. 15 describes a routine used to inquire of the speech processor's status bits as to how large a memory the speech processor has. After initializing the processor at 1502, setting its counters to zero count, this routine stores the special command $FF00 in the processor (Note: the speech processor routine that responds to this special command is not disclosed in this application which assumes a fixed sized memory). Note that the bytes $FF and $00 are simply stored in computer 102's memory location "$CO80+$10 (Slot)" which means in location $CO90 if the processor is in slot 1, and so on. The speech processor is then enabled at 1506, and a 255 millisecond timer is established at 1508. A loop (1510, 1512, 1516) is then enetered. During each pass, this loop uses the machine language addressing scheme indicated at 1510 to transfer status data from the microcomputer 202, through the latch 246, and into the accumulator of computer 102. When bit 4 (the "busy" bit) changes at (1512, the status data is accepted. Bits 1 and 2 indicate memory size at 1514. If the speech processor remains busy for too long, step 1516 routes program control to an error routine 1518.

FIG. 16 illustrates the details of transferring speech data from a disk file into the speech memory 214. The file "soundtrack" is first transferred from a disk file into core memory at 1602. Then, one byte at a time, the data is presented to the memory location whose address is computed as shown at 1604.

FIG. 17 illustrates how the speech processor can be reset. The slot number (of the peripheral connector slot where the speech processor 200 resides) is placed in index registry Y and is thereby added to the base address $CO81 to produce the proper address. The "1" least significant digit energizes the B input of the 3 to 8 line decoder 302 (FIG. 3) and causes the COUNT O signal 217 to reset the counters 218 and 220 (FIG. 2) to zero.

FIG. 19 is similar to FIG. 17 but illustrates how the speech processor is placed into operation by addressing the base address $CO83 instead of $CO81. The "3" actuates inputs A and B and therefore actuates output 3 of the 3 to 8 line decoder 302 (FIG. 3) which is the ENABLE signal 1242 that sets the bistable 240 and places the speech processor 200 into operation.

SAYTHIS Subroutine

The subroutine SAYTHIS (FIG. 187) is used by both the routines SIMA (FIG. 12) and SIMB (FIG. 13) to solicit hexadecimal digits, check them for errors, pack pairs of them into bytes, and feed the bytes to the speech processor 200. After prompting for two hexadecimal digits at 1802, the PACK subroutine accepts the digits, checks them for errors, and forms a byte from them. Steps 1806 and 1808 check to insure the digits are valid speech or delay commands. Then at 1810 the first byte of the command is fed into the speech memory 214. Then PACK solicits two more hexadecimal digits at 1812, and these are transferred to the memory 214.

PACK Subroutine

This subroutine 2000 (FIG. 20) simply accepts two ASCII keystrokes, converts them to hexadecimal, error checks them, and packs them into a byte.

BUSY subroutine

This subroutine (FIG. 21) determines the busy status of the speech processor 200 by loading the accumulator from the address indicated at 2110 and selecting the fourth bit to test 2112 and 2114. The carry flag is used as a return argument at 2116 and 2120. If the processor 200 is busy, the message at 2118 is displayed.

Detailed Program Listings

The following program listings were used to develop the computer programs that are to be found in the preferred embodiment of the invention.

The first set of programs are designed for installation in an Apple II+ microcomputer and for use in conjunction with that computer. A complete technical description of the Apple II computer, as well as a description of the mnemonic instruction language used below, can be found in the book entitled "Apple II Reference Manual" published in 1979 by Apple Computer, Incorporated. Pages 118 to 128 of that book introduce the 6502 microprocessor instruction set which is used in the programs that follow. Further information can be found in the book "Programming the 6502" written by Rodney Zaks and published by Sybex Incorporated, Berkeley, Calif. The Apple II+ peripheral connector bus and all of its signals, including those shown in FIG. 3, is described on pages 106 to 109 of the "Apple II Reference Manual," and the timing of these signals is indicated on page 91 of that book.

The second set of programs are designed for installation in the read-only-memory portion of an R6500/1 microcomputer system that forms a portion of the speech processor. This system is described in document No. 29650 N48 published in June of 1979 by Rockwell International Corporation, a manufacturer of this system (the document is entitled: "R6500 Microcomputer System Product Description: R6500/1 One-Chip Microcomputer."). The mnemonic instruction language for the R6500/1 is identical to that for the 6502 processor used in the Apple II+, so no separate reference book on the R6500/1 is required to understand the second set of programs. The R6500/1 contains 64 bytes of RAM positioned at memory addresses $0 to $03F and 2K of ROM positioned at $800 to $FFF. All variables are stored in RAM and all programs are stored in ROM. Its four external ports A, B, C and D are located at addresses $80, $81, $82 and $83, respectively.

Speech Control Program Listing

The following is an actual program used to program the computer to operate the speech processor maintenance and diagnostic routines and other material not essential to a full understanding of the present invention have been omitted to keep the listing as simple and understandable as possible.

FIGS. 10 through 21 of the drawings constitute a complete, detailed flow diagram of the programs that follow Program address and subroutine names are the same in both the flow diagram and in the programs that follow. The main program is set out first, and it is followed by the subroutines which are arranged in alphabetical order.

Certain locations within the address space of the computer enable one to access the peripheral connector bus and to communicate over the bus with the speech processor. Those locations are assigned symbolic addresses which are indicated on the first page of the program listing that follows. The location SLOT contains the slot number where the speech processor is located within the computer, and this slot number is frequently used in computing the addresses which are assigned to the various symbolic names.

```
*
* PAGE ZERO VARIABLES
*
*
OFF       EQU   $F9           OFFSET TO ESCAPE APPLE OS
PHRASES   EQU   6             PHRASE #
SLOT      EQU   7             SLOT # OF SPEECH BOARD (00-70)
BITS      EQU   8             BIT WIDTH OF MEMORY (0-3)
LIMIT     EQU   9             MEMORY LIMIT: 00-8, 40-4, 80-2
TEMP      EQU   10            TEMPORARY USE
MEMORY    EQU   11            CARD POINTER: $C080 + $10(SLOT)
STATUS    EQU   13            STATUS POINTER: $C000 + $100(SLOT)
*
TEXT      EQU   0+OFF         TEXT ADDRESS
ASCII     EQU   2+OFF         ERROR ASCII DATA
CHAR      EQU   3+OFF         TEMP
ADDR      EQU   4+OFF         DEBUG USE
COMMAND   EQU   6+OFF         CURRENT DIAGNOSTIC COMMAND
*
*
* ASSEMBLER CONSTANTS
*
*
KEYDATA   EQU   $C000         KEYBOARD DATA
CLRKEY    EQU   $C010         ACCESS CLEARS KEY FLAG
MEMORG    EQU   $8000
```

```
*
*
* I/O PORT ASSIGNMENTS
*
*
*
* MEMORY = SPEECH BOARD WRITE MEMORY = $C080 + $10(SLOT)
RESET0     EQU    $C081         RESET ADDRESS COUNTERS
RESET      EQU    $C082         RESET SPEECH BOARD ( NMI/)
* STATUS = R6500 STATUS OUTPUT = $C000 + $100(SLOT).
* +-------+---+---+---+---+--------+----+----+
* I BUSY I 1 I 0 I 1 I 1 I VALID I B1 I B2 I
* +-------+---+---+---+---+--------+----+----+
* BIT 7    6   5   4   3      2      1    0
*
*   MEMORY BIT WIDTH: VALID B1 B2    MODE      MEMORY
*                       0    X  X    INVALID    SIZE
*    INIT: 5B            1    0  0   2 BITS     16K
*    BITS: 5B+N          1    0  1   4 BITS     32K
*    TALK: D8+N          1    1  0   6 BITS     48K
*    DONE: 5B+N          1    1  1   8 BITS     64K
*
*
ENABLE     EQU    $C083         ENABLE SIGNAL TO R6500
PRE64      EQU    $C088         PRESET / DATA PORT
STAT65     EQU    $C08A         STATUS
D5220      EQU    $C08C         5220
MASTER     EQU    $C08E         MASTER CONTROL PIA
*
*
*  SUBROUTINE LINKAGES
*
RDKEY      EQU    $FD0C         READ KEYBOARD = A.
COUT       EQU    $FDED         DISPLAY A
PRBYTE     EQU    $FDDA         PRINT A AS 2 ASCII CHAR.
*
           ORG    MEMORG
*
           JMP    INIT
           JMP    SIMENU
           JMP    BITSIZE
```

The "SUBROUTINE LINKAGES" listed above are linkages to external subroutine utilities which form a part of the operating system of the computer and which facilitate single byte communication between the programs and the user sitting before the keyboard and display.

The following program initializes the computer, searching the accessory slots for the speech processor.

```
*
INIT       NOP
*
*   FIND WHICH SLOT WE ARE USING
*
           CLD
           LDX    #$C1           SLOT 1
SLOTS      LDA    $C100          READ 'STATUS' IN SLOTS
           CMP    #$5B           PROPER RESET STATUS
           BEQ    SLOTTED
           INX
           STX    SLOTS+2        INCREMENT READ ADDRESS
           CPX    #$C8           PAST LAST SLOT
           BCC    SLOTS          KEEP SEARCHING
*
*   SPEECH BOARD NOT IN ANY SLOT
*
           JSR    DOTEXT
           ASC    "SPEECH BOARD NOT FOUND"
           DFB    0
           JMP    FILL
SLOTTED    STX    STATUS+1
           LDA    #0             SET STATUS CARD POINTER
           STA    STATUS
           JSR    CRLF
           JSR    DOTEXT
```

```
            ASC    "SPEECH BOARD IN SLOT # "
            DFB    0
            LDA    STATUS+1
            AND    #7
            STA    SLOT            NOT CORRECT SLOT X $16 YET
            ORA    #$B0            CONVERT TO ASCII
            JSR    COUT
            JSR    CRLF
*
            LDA    SLOT            SLOT X $16 = SLOT.
            ASL
            ASL
            ASL
            ASL
            STA    SLOT
            ORA    #$80            LOW OF $C080 + $16(SLOT)
            STA    MEMORY          MUST USE (MEMORY,X) ADDRESS MODE;
            LDA    #$C0            MEM,Y OR (MEM),Y CAUSE DOUBLE
            STA    MEMORY+1        ACCESS: SKIPS MEMORY LOCATIONS!
```

The following code asks the speech processor how large its memory is. For purposes of this disclosure, it is assumed that the speech processor has a full size 64K RAM, and all code relating to the handling of smaller size memories has been deleted. A flow chart appears in FIG. 15.

```
*
*   FILL RAM FOR SIZE CALCULATION
*
            LDY    SLOT
            LDX    #0
            LDA    RESET0,Y        ZERO ADDRESS
            LDA    #$FF
            STA    (MEMORY,X)      FF=0000
            LDA    #0
            STA    (MEMORY,X)      00=0001
            LDA    ENABLE,Y        ENABLE 6500
BITSIZE     LDA    #255            255 MS TIMEOUT
            STA    TEMP
            LDY    SLOT
BITLOOP     LDA    (STATUS),Y
            AND    #4
            BNE    GOTBIT          BIT=1 WHEN MEMORY SIZE KNOWN
            LDX    #$C5            GIVES 1 MS DELAY
            JSR    DELAY
            DEC    TEMP
            BNE    BITLOOP         LOOP UNTIL GOTBIT OR TIMEOUT
*
            JSR    CRLF
            JSR    DOTEXT
            ASC    "TIMED OUT WAITING FOR MEMORY SIZE"
            DFB    0
GOTBIT      JSR    CRLF
            LDY    SLOT
            LDA    (STATUS),Y      READ MEMORY CODE FROM 6500.
            AND    #3
            STA    BITS
*
*   SET DIAGNOSTIC MEMORY LIMITS
*
            LDY    #0              8 BIT LIMIT
            STY    LIMIT
```

The routine FILL, flow charted in FIG. 10, transfers speech data from the disk file SOUNDTRACK into the speech processor's RAM and illustrates how speech data is loaded into the speech processor.

```
*
*   FILL MEMORY ACCORDING TO # BITS/BYTE
*
FILL        JSR    CRLF
            JSR    DOTEXT
            ASC    "LOAD SOUNDTRACK? "
            DFB    0
```

```
          LDA    CLRKEY
          JSR    RDKEY       GET RESPONSE
          JSR    COUT
          AND    #$7F        CONVERT TO ASCII
          CMP    #'Y
          BNE    SIMENU
          JSR    DOTEXT
          HEX    8D84        DOS CODE
          ASC    "BLOAD SOUNDTRACK,A$7000"
          HEX    8D00
*
          LDY    SLOT
          LDA    RESET0,Y    ZERO ADDRESS
          LDX    #$70        HI BUFFER START
          STX    ADDR+1
          LDY    #0          LO BUFFER START
          STY    ADDR
*
CRAMIT    LDA    (ADDR),Y    READ BUFFER DATA
          JSR    STORE       INTO DRAM
          INY
          BNE    CRAMIT
          INC    ADDR+1
          LDX    ADDR+1
          CPX    #$79        DONE?
          BCC    CRAMIT
```

The routine SIMENU and SIMULATE, flow charted in FIGS. 10 and 11, asks the user for a speech phrase request number and then initiates operation of the speech processor.

```
*
********* SIMULATE *********
*
* FUNCTION: SIMULATE APPLE WITH INDEPENDENT 6500 ONBOARD
* INPUTS:   ACCEPTS CHARS FROM ITS MENU
* OUTPUTS:  INSERTS COMMANDS INTO DRAM, AND EXECUTES
* DESTROYS: A,X,Y,PHRASES
* CALLS:    SAYTHIS, MESAGE, RDKEY, DOTEXT
*
SIMENU    JSR    CRLF
          JSR    CRLF
          JSR    CRLF
          JSR    DOTEXT
          ASC    "      APPLE SPEECH SIMULATOR MENU"
          DFB    0
          JSR    CRLF
          JSR    CRLF
          JSR    DOTEXT
          ASC    "A. SINGLE PHRASE"
          DFB    0
          JSR    CRLF
          JSR    DOTEXT
          ASC    "B. MULTI-PHRASE"
          DFB    0
          JSR    CRLF
          JSR    DOTEXT
          ASC    "C. RESTART SPEECH BOARD"
          DFB    0
          JSR    CRLF
          JSR    DOTEXT
          ASC    "X. EXIT TO APPLE MONITOR"
          DFB    0
SIMULAT   JSR    CRLF
          LDX    #0
          JSR    MESAGE      "YOUR CHOICE?"
*
          LDA    CLRKEY      CLEAR KEY FLAG
          JSR    RDKEY       GET RESPONSE
          JSR    COUT
          AND    #$7F
          CMP    #'A
          BEQ    SIMA        ONE PHRASE
          CMP    #'B
          BEQ    SIMB        MULTI PHRASES
```

```
            CMP     #'X
            BEQ     MONOUT          TO APPLE MONITOR
            JMP     SIMENU          ILLEGAL INPUT
MONOUT      JMP     $FF69           APPLE MONITOR
```

The routine SIMA, flow charted in FIG. 12, accepts a single speech phrase number and passes it to the speech processor.

```
*
* SINGLE PHRASE
*
SIMA        JSR     BUSY            6500 BUSY?
            BCC     AOK
            JMP     SIMULAT
AOK         LDY     SLOT
            STA     RESET0,Y        RESET ADDRESS COUNTERS
            JSR     SAYTHIS         GET PARAMETERS
            BCS     SIMA            ILLEGAL PHRASE #
LEAVE2      LDY     SLOT
            LDA     ENABLE,Y        ENABLE 6500
SIMULA1     JMP     SIMULAT         NO DATA EXPECTED
```

Figure 13:
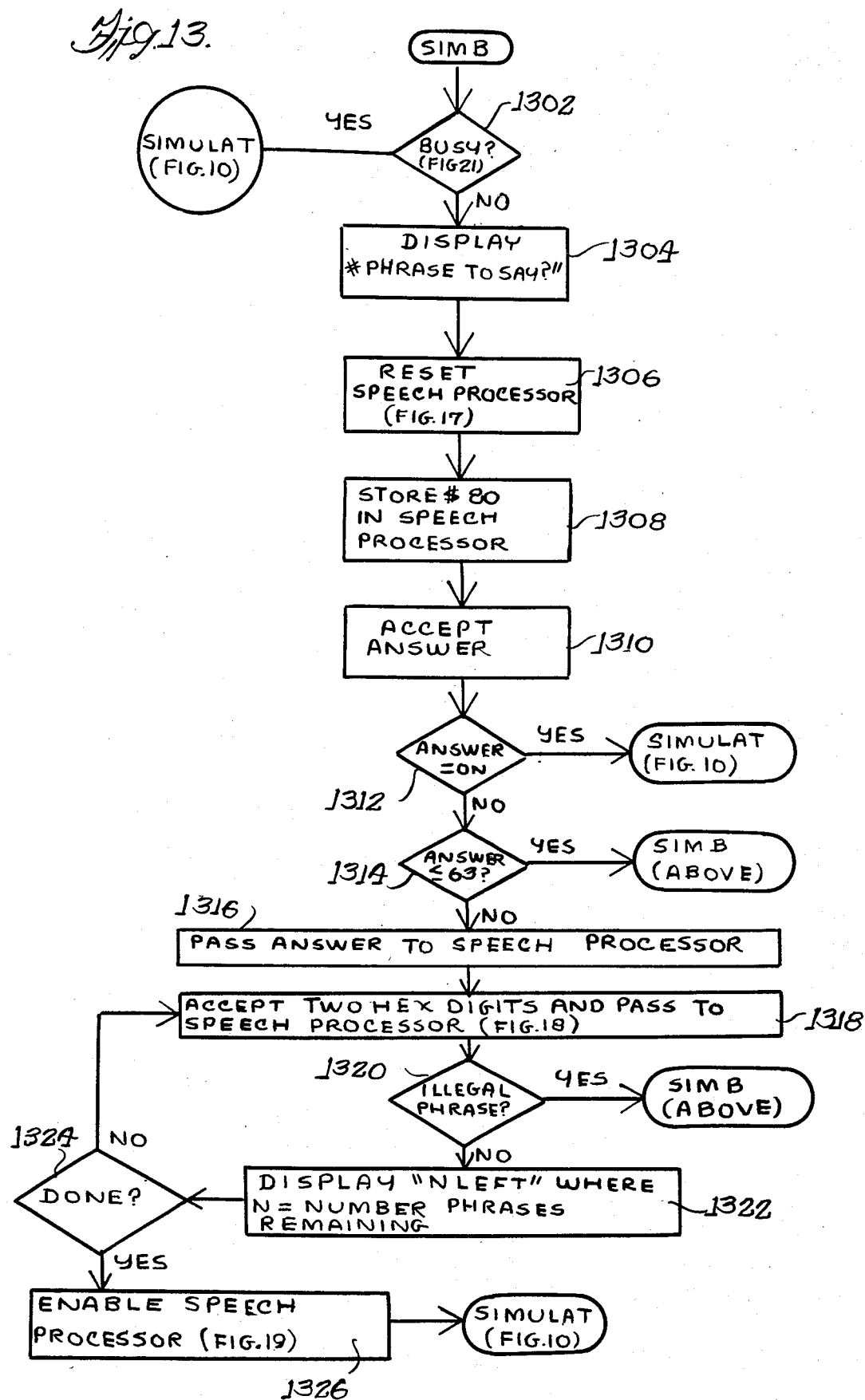
FIG. 13 is a flow diagram of the SIMB portion of the speech control program 104.

The routine SIMB, flow charted in FIG. 13, accepts a multiple speech phrase request and passes it on to the speech processor.

```
*
* MULTI-PHRASE
*
SIMB        JSR     BUSY            6500 BUSY?
            BCC     BOK
            JMP     SIMULAT
BOK         LDX     #2
            JSR     MESAGE          "# PHRASES TO SAY?"
            LDY     SLOT
            LDA     RESET0,Y        ZERO ADDRESS COUNTERS
            LDA     #$80            MULTI CODE
            JSR     STORE
            JSR     PACK            GET # OF PHRASES
            BEQ     SIMULA1         OUT FOR NONE
            CMP     #63+1           MAX PHRASES
            BCS     SIMB
            STA     PHRASES
            JSR     STORE           # TO DO
INMULTI     NOP
            JSR     SAYTHIS         COLLECT PARAMETERS
            BCS     SIMB            ILLEGAL INPUT
            JSR     SPACE
            JSR     SPACE
            LDX     PHRASES
            DEX
            TXA
            JSR     PRBYTE          NUMBERING PROMPT
            JSR     DOTEXT

ASC     " LEFT."
            DFB     0
            DEC     PHRASES
            BNE     INMULTI         SET PARAMETERS FOR ALL PHRASES
            JMP     LEAVE2          DO IT.
```

The following subroutines, listed in alphabetical order, support the operation of the above routines.

```
*
*
********** BUSY CHECK **********
*
* FUNCTION: SEE IF 6500/1 IS AVAILABLE FOR COMMANDS
* INPUTS:   6500/1 STATUS, SLOT
* OUTPUTS:  MESSAGE AND C=1 IF BUSY.
* DESTROYS: A,Y
*
BUSY        LDY     SLOT
```

```
            LDA    (STATUS),Y   IS 6500 BUSY?
            AND    #$80         BIT 7 IS BUSY BIT
            BEQ    NOTBUSY      BUSY
            JSR    CRLF
            JSR    DOTEXT
            ASC    "SPEECH BOARD IS BUSY NOW."
            DFB    0
            SEC                 ;BUSY FLAG
            RTS
NOTBUSY     CLC                 ;NOT BUSY FLAG
            RTS
*
********** RETURN & LINE FEED **********
*
* FUNCTION: DISPLAY RETURN & LINE FEED TO TERMINAL
* INPUTS:   NONE
* OUTPUTS:  CR & LF
* DESTROYS: NIL
* CALLS:    COUT
*
CRLF        PHA
            LDA    #$8D
            JSR    COUT
            PLA
            RTS
*
*************** PROGRAMMABLE DELAY ***************
*
* FUNCTION: DELAY
* INPUTS:   X HAS DELAY PARAMETER
* OUTPUTS DELAY = 12+ 5X MICROSECONDS AT 1MHZ
* DESTROYS: X=0
*
DELAY       DEX
            BNE    DELAY
            RTS
*
********** DISPLAY TEXT **********
*
* FUNCTION: DISPLAY MESSAGES TO THE CRT.
* INPUTS:   ASCII STRING ATER THE JSR, $00 END FLAG.
* OUTPUTS:  CRT MESSAGE DISPLAY
* DESTROYS: A,Y,TEXT
*
DOTEXT      PLA
            STA    TEXT         RETURN ADDRESS = MESSAGE START.
            PLA
            STA    TEXT+1
            LDY    #1
*
GETCHR      LDA    (TEXT),Y     GET MESSAGE BYTE
            BEQ    TXTEND       0=MESSAGE END
            JSR    COUT
            INY
            BNE    GETCHR       MAX 255 CHAR
TXTEND      TYA
            CLC
            ADC    TEXT         RETURN = TEXT + Y OFFSET
            STA    TEXT
            LDA    #0
            ADC    TEXT+1
            PHA    PUSH         HI PART FIRST
            LDA    TEXT
            PHA    PUSH         LO PART LAST
            RTS
*
********** MESAGE **********
*
* FUNCTION: DISPLAY ERROR MESSAGES
* INPUTS:   X = MESSAGE NUMBER
* OUTPUTS:  VIDEO TEXT
* DESTROYS: ALL
* CALLS:    CRLF, PRTBYTE, OUTPUT
*
```

```
MESAGE     JSR    CRLF
*
*   MAKE MESSAGE OFFSET FROM X
*
           TXA
           ASL                  ;MULTIPLY BY 16
           ASL
           ASL
           ASL
           TAY
*
           LDX    #16-1         * CHARACTERS TO DISPLAY
PRTERR     LDA    MESS,Y
           JSR    COUT
           INY
           DEX
           BPL    PRTERR        DO ALL CHARACTERS
           RTS
*
*
*  M M M M M M M M M M M M M
*
*  CHAR            0        1
*  POSITION:       1234567890123456
MESS       ASC    "   YOUR CHOICE? " 0
           ASC    "PHRASE 0000-0260" 1
           ASC    "# PHRASES TO DO?" 2
           HEX    11111111111111111111111111111111
           HEX    11111111111111111111111111111111
           ASC    "     DIAG      "
           HEX    830201
           HEX    11111111111111111111111111111111
*
********** PACK ASCII TO HEX **********
*
* FUNCTION: CONVERT 2 ASCII BYTES TO 1 HEX BYTE
* INPUTS:   2 ASCII HEX BYTES FROM TI ENCODER
* OUTPUTS:  A= HEX BYTE, C=1 IF ERROR
* DESTROYS: A, CHAR
* CALLS:    RDKEY, ASCBIN
*
PACK       JSR    RDKEY         GET ASCII DATA
           JSR    COUT
           JSR    ASCBIN        CONVERT TO BINARY
           BCS    NOTHEX        FOR NON HEX DATA
           ASL
           ASL                  ;MOVE TO LEFT NIBBLE
           ASL
           ASL
           STA    CHAR
           JSR    RDKEY         GET 2ND CHAR
           JSR    COUT
           JSR    ASCBIN        CONVERT TO BINARY
           BCS    NOTHEX        FOR NON HEX DATA
           ORA    CHAR          COMBINE NIBBLES
           CLC    NO            ERROR
PAKOUT     RTS
NOTHEX     LDA    #$A4          $ =NON HEX DATA
           JSR    COUT
           LDA    ASCII         GET BAD ASCBIN #
           JSR    PRBYTE
           SEC                  ;ERROR FLAG
           RTS
*
********** CONVERT ASCII TO BINARY **********
*
* FUNCTION: CONVERT ASCII BYTE TO BINARY BYTE
* INPUTS:   A=ASCII INPUT
* OUTPUTS:  A=BINARY (0-F), C=1 IF NON HEX INPUT
* DESTROYS: A,ASCII
```

```
*
ASCBIN    AND    #$7F
          STA    ASCII
          CLD
          CMP    #$3A         ASCII NUMBER?
          BMI    NUMBER
          CMP    #$41         BETWEEN A-F?
          BMI    OUT          NON-HEX
          CMP    #$47         OVER F?
          BPL    OUT          NON-HEX
          SEC
          SBC    #7           PARTIAL CONVERSION OF A-F
NUMBER    SEC
          SBC    #$30         CONVERT NUMBERS 0-9
          BMI    OUT          NON-HEX
          CLC
          RTS
*
OUT       SEC    ERROR        EXIT
          RTS
*
********** SAY THIS **********
*
* FUNCTION: COLLECT PHRASE NUMBERS
* INPUTS:   4 DIGIT HEX PHRASE #, 000-260, C000-
* OUTPUTS:  PLACE COMMANDS INTO DRAM, C SET IF ERROR.
* DESTROYS: DRAM, A
* CALLS:    RDKEY, PACK
*
SAYTHIS   LDX    #1
          JSR    MESAGE       "HEX PHRASE #"
          JSR    SPACE
          JSR    PACK         GET HI ADDRESS
          CMP    #2+1         OVER SPEECH?
          BCS    NOVOICE      NOT SPEECH
DELCODE   JSR    STORE        INTO DRAM
          JSR    PACK
          JSR    STORE
          CLC
          RTS
*
NOVOICE   CMP    #$C0         DELAY?
          BCS    DELCODE
          SEC                 ;ERROR FLAG
          RTS
*
********** SPACE **********
*
* FUNCTION: OUTPUT SPACE FOR APPLE
* INPUTS:   ENTRY
* OUTPUTS:  SPACE
* DESTROYS: A
* CALLS:    COUT
*
SPACE     LDA    #$A0
          JMP    COUT
*
********** STORE INTO MEMORY **********
*
* FUNCTION: MEMORY STORE
* INPUTS:   A=DATA, NUMBITS, (SLOT)
* OUTPUTS:  DATA INTO 1 MEMORY LOCATION
* DESTROYS: A, TEMP
*
STORE     PHA
          STX    TEMP
          LDX    #0           SETUP INDEX
```

Processor Control Program Listing

The following is the actual program used to program the microcomputer in the preferred embodiment of the invention. Maintenance and diagnostic routines and other material not essential to understanding the present invention have been omitted to keep the listing as simple and as understandable as possible.

FIGS. 22 through 29 of the drawings constitute a complete, detailed flow diagram of the programs that follow. Program address and subroutine names and some variable names are the same in both the flow diagram and in the programs that follow. The main program is set out first, and it is followed by the subroutines which are arranged in alphabetical order.

As the "I/O PORT ASSIGNMENTS" portion of this listing indicates, microcomputer port A is addressed as "PRE64," port B is addressed as "STAT65," port C is address as "MASTER," and port D is addressed as "D5220." The bit assignments within these locations to external signals is also set out in this section. With reference to "MASTER" or "PORT C:" the NEXT signal is called NXT and is assigned to bit 5; the EN DATA signal is called EN and is assigned to bit 3; the LOAD signal is called LD and is assigned to bit 1; and the BD EN signal is called BDEN and is assigned to bit 0. The four remaining signals, RDY, INT, RS, and WS all flow between the voice synthesizer and the microcomputer.

The following table assigns names and locations to variables and assigns names to the system ports and control register.

```
*
* PAGE ZERO VARIABLES
*
OFF        EQU   0            NO OFSET IN R6500
ADDR0      EQU   0+OFF        DATA FROM ADDRESS 0
ADDR1      EQU   1+OFF        DATA FROM ADDRESS 1
NUMBITS    EQU   2+OFF        NUMBER OF BITS IN RAM BYTE
LIMIT      EQU   3+OFF        DIAGNOSTIC MEMORY LIMIT
TEXT       EQU   4+OFF        - TEXT ADDRESS
ASCII      EQU   6+OFF        - NOT USED IN R6500
CHAR       EQU   7+OFF        - NOT USED IN R6500
ADDR       EQU   8+OFF        TABLE, DEBUG USE
PATERN     EQU   $A+OFF       - MEMORY TESTING PATTERN
START      EQU   $B+OFF       - EXAMINE MEMORY START, LOW
MEND       EQU   $D+OFF       - EXAMINE END, LOW
PHRASE     EQU   $10+OFF      CURRENT PHRASE #, 1-31 (0=SINGLE)
PHRASES    EQU   $11+OFF      TOTAL # OF PHRASES TO DO, 1-31
BYTE       EQU   $12+OFF      - SCRATCHPAD FOR RAM READ
COMMAND    EQU   $13+OFF      - DIAG COMMAND
TEMPX      EQU   $14+OFF      - TEMPORARY X
TEMPY      EQU   $15+OFF      - TEMPORARY Y
DATADEL    EQU   $16+OFF      - INTER-DATA DELAY IN MS
SUM80      EQU   $17+OFF      - DATA CHECKSUM GIVEN BY TEST 'A'
*
MEMORG     EQU   $800         R6500 START
*
* I/O PORT ASSIGNMENTS
*
PRE64      EQU   $80          PORT A
STAT65     EQU   $81          PORT B
* +------+---+---+---+---+-------+----+----+
* I BUSY I 1 I 0 I 1 I 1 I VALID I B1 I B2 I
* +------+---+---+---+---+-------+----+----+
* BIT 7    6   5   4   3     2     1    0
*
*   MEMORY BIT WIDTH: VALID B1 B2    MODE      MEMORY
*                       0    X  X    INVALID    SIZE
*       INIT: 5B        1    0  0    2 BITS     16K
*       BITS: 58+N      1    0  1    4 BITS     32K
*       TALK: D8+N      1    1  0    6 BITS     48K
*       DONE: 58+N      1    1  1    8 BITS     64K
*
MASTER     EQU   $82          PORT C

* +-----+-----+-----+----+----+----+----+------+
* I /RDY I /INT I /NXT I /RS I /EN I /WS I /LD I BDEN I
* +-----+-----+-----+----+----+----+----+------+
* BIT 7    6     5    4    3    2    1    0
* USE 1    1     0    1    1    1    1    1
*
D5220      EQU   $83          PORT D
* +---------+-----------+-------------+---+
* I TALKING I BUFFER LOW I BUFFER EMPTY I 1 ...
* +---------+-----------+-------------+---+
* BIT  7           6            5        4 ..
*
*
CONTROL    EQU   $8F          CONTROL REGISTER
```

The following speech processor RAM memory map and speech command key forms a part of the processor control program's comments.

```
*
*              DYNAMIC RAM ALLOCATION
*
* FFFF  +-------------------------------+
*       |                               |
*       |                               |
*       |           TI 5220             |
*       |         SPEECH DATA           |
*       |                               |
* 0540  |                               |
*       +-------------------------------+
* 053F  |      HIGH SOUNDTRACK #        |
* 053E  |       LOW SOUNDTRACK #        |
* 053D  |  HI LAST VALID DATA ADDR      |
* 053C  |  LO LAST VALID DATA ADDR      |
*       +-------------------------------+
* 053B  |   VECTORS TO SPEECH DATA      |
* 0082  |     IN LOW, HI FORMAT         |
*       +-------------------------------+
* 0081  |           UNUSED              |
* 0080  |     STORED DATA CHECKSUM      |
*       +-------------------------------+
* 007F  |     SPEECH COMMANDS AND       |
*       |    DIAGNOSTIC PARAMETERS      |
*       |    0=PHRASE # HI, 1=LOW       |
* 0000  +-------------------------------+
*
*
*    SPEECH COMMANDS (HI PART)
*
*    00-02   SPEAK THIS PHRASE    (TO $260)
*    10-1F   DIAGNOSTICS
*    20-7F
*      80    MULTIPHRASE SPEAK
*    81-BF
*    C0-FF   PROGRAMMED DELAY
*
*
```

The program segment which follows initializes the microcomputer. Some portions which have been omitted determine how much memory is present and set a value in location NUMBITS to indicate the memory size. For purposes of this description, a full 64K memory is assured, and NUMBITS therefore contains the integer 3 to signal this fact. The program comments are retained unchanged from the actual program listing.

```
*
*     INITIALIZE ALL I/O PORTS
*
            ORG     MEMORG
*
RESET       JMP     RES1
            JMP     SCAN
            JMP     ENWAIT1     SIMULATION
            JMP     ENWAIT2     SIMULATION RE-ENTRY
            JMP     BITSET      SIMULATION
RES1        NOP
            LDA     #0
            STA     CONTROL     R6500 CONTROL REG.
            LDX     #$3F
            TXS                 ;
            LDA     #$FF
            STA     PRE64
            STA     D5220
*
            LDX     #$3F        SET ALL PAGE ZERO RAM TO $11
            LDA     #$11        TO CLEAN UP DIAGNOSTIC 'F'
INITRAM     STA     $0,X
            DEX                 ;
            BNE     INITRAM
            LDA     #$FF
            STA     MASTER      SET CONTROLS
            LDA     #$5B        SHOW STATUS: APPLE FINDS SLOT #
```

```
            STA     STAT65
            LDA     #19             19 MS DATA DELAY
            STA     DATADEL
*
*   INITIALIZE SYNTHESIZER
*
            LDY     #9              WRITE 9 $FF BYTES
ISYN        LDA     #$FF
            JSR     WRITE           WRITE TO 5220
            LDX     #60
            JSR     DELAY           NEED 300 US RESET DELAY
            DEY
            BNE     ISYN            DO ALL 9 FF'S
*
```

The main processor control program listing follows. It is flow charted in FIGS. 22 through 25, starting with the entry SCAN in FIG. 25.

```
*
*       +++++   MAIN PROGRAM    +++++
*
*
SCAN        LDA     #$FD
            STA     MASTER          /LOAD=0
            LDA     #$FF            /LOAD=1
            STA     MASTER          DISABLE BOARD
            LDA     NUMBITS
            AND     #$7F            RESET BUSY LINE
            STA     STAT65          BUSY = 0
ENWAIT2     LDA     MASTER          WAIT FOR NEXT BOARD ENABLE
            AND     #1
            BEQ     ENWAIT2
*
            LDA     NUMBITS
            ORA     #$80            BUSY=1 IN STATUS
            STA     STAT65
            LDA     #0
            STA     PHRASE          DEFAULT TO SINGLE PHRASE
            LDA     #1
            STA     PHRASES         DEFAULT 1 PHRASE
*
*   GET COMMANDS
*
            JSR     READ01          READ LOC 0&1
            LDA     ADDR0
            CMP     #2+1            PHRASE $300 PAST LIMIT
            BCC     SPEECH          DO SPEECH
            BNE     NOTALK          NOT SPEECH
            LDX     ADDR1
            CPX     #$60            MAX PHRASE IS # $25F
            BCC     SPEECH
NOTALK      CMP     #$28            MULTIPHRASE COMMAND
            BNE     NOMULTI
*
            LDA     #1
            STA     PHRASE          FIRST ONE TO SAY
            LDA     ADDR1
            AND     #$1F            MAX # OF PHRASES
            STA     PHRASES
            JMP     SPEECH
NOMULTI     CMP     #$C0            DELAY?
            BCS     DELA
            CMP     #$20            DIAGNOSTIC?
            BCS     SCAN            ERROR INPUT
DELA        JSR     DODELAY
            JMP     SCAN
```

The SPEECH segment is flow charted beginning in FIG. 23 and the TABLED segment is flow charted in FIG. 24.

```
*
*   GET WORD START FROM THE TABLE
*
SPEECH      LDA     PHRASE          =0 FOR SINGLE PHRASE, 1-31 ELSE
            BEQ     SINGLE
```

```
           JSR    READ01      SYNC TO LOCATION 2
           LDA    PHRASE      PHRASE #= INDEX
           AND    #$1F
           TAX
*
NEXTSET    JSR    READMEM     NEXT PHRASE PARAMETERS
           STA    ADDR0
           JSR    READMEM
           STA    ADDR1       SET FOR PHRASE N+1
           DEX                ;X= CURRENT PHRASE #
           BNE    NEXTSET     LOOP TILL PROPER PHRASE INDEXED
           INC    PHRASE      POINT TO NEXT PHRASE
           LDA    ADDR0
           CMP    #$C0        IS THIS A DELAY?
           BCC    SINGLE      NO
           JSR    DODELAY     DO DELAY
           DEC    PHRASES
           BNE    SPEECH      MORE TO SAY!
           JMP    DONESAY     DONE WITH SPEECH
*
SINGLE     ASL    ADDR1       DOUBLE INDEX
           ROL    ADDR0
           LDA    ADDR1       ADD 80 OFFSET
           CLD
           CLC
           ADC    #$80        $80 OFFSET TO TABLE
           STA    ADDR        LO TABLE ADDRESS
           LDA    #0
           ADC    ADDR0
           STA    ADDR+1      HI TABLE ADDRESS
           JSR    PRESET      SET HI TABLE ADDRESS
           LDX    ADDR        AUTO-INC TO LOW TABLE ADDRESS
           BEQ    TABLED      ALREADY AT TABLE ADDRESS
AUTO1      JSR    READMEM     TOO SLOW?
           DEX
           BNE    AUTO1       KEEP GOING
*
TABLED     JSR    READMEM     READ LOW SPEECH DATA ADDRESS
           STA    ADDR0
           JSR    READMEM     READ HI SPEECH DATA ADDRESS
           JSR    PRESET
           LDA    ADDR0
           LDX    ADDR0       AUTO-INC TO LOW DATA ADDRESS
           BEQ    DATADDR     ALREADY AT DATA ADDRESS
AUTO2      JSR    READMEM     TOO SLOW?
           DEX
           BNE    AUTO2       KEEP GOING
DATADDR    NOP
*
```

The segment DATADDR, which appears below, is also flow charted in FIG. 24

```
*
* RESET SYNTHESIZER
*
           LDA    #$FF        RESET COMMAND
           JSR    WRITE       SEND TO 5220
           LDX    #60         300 US DELAY
           JSR    DELAY
*
*   SAY CURRENT PHRASE
*
           JSR    SAY
           BCS    SAYWHAT     STATUS BAD, ERROR EXIT.
           DEC    PHRASES     GO TO NEXT PHRASE
           BEQ    DONESAY
           JMP    SPEECH      NEXT IN MULTIPHRASE SEQUENCE.
DONESAY    LDA    NUMBITS
           STA    STAT65      BUSY=0 IN STATUS
           JMP    SCAN        SCAN FOR NEXT INPUT
*
* ERROR EXIT
*
SAYWHAT    CLC
           JMP    SCAN        FATAL ERROR: RESTART
*
```

The subroutines that form a portion of the processor control programs are set forth below, together with the comments from the actual program listing. The subroutines are set forth in alphabetical order. Flow charts of the more important subroutines appear in FIGS. 25 to 29 of the drawings.

```
*
*************** PROGRAMMABLE DELAY ***************
*
* FUNCTION: DELAY
* INPUTS:   X HAS DELAY PARAMETER
* OUTPUTS DELAY = 12+ 5X MICROSECONDS AT 1MHZ
* DESTROYS: X=0
*
DELAY     DEX
          BNE  DELAY
          RTS

*
********** DELAY COMMAND *********
*
* FUNCTION: DO DELAY COMMAND
* INPUTS:    (ADDR0 - C0) * 3.2 SEC = DELAY (HI)
*   +------+------+------+------+------+------+------+------+
*   | -1-  | -1-  | 102.4| 51.2 | 25.6 | 12.8 | 6.4  | 3.2  |
*   +------+------+------+------+------+------+------+------+
*
*          ADDR1 * 12.5 MS = DELAY (LOW)
*   +------+------+------+------+------+------+------+------+
*   | 1.6  | 0.8  | 0.4  | 0.2  | 0.1  | 0.05 | 0.025| 0.0125|
*   +------+------+------+------+------+------+------+------+
*
* OUTPUTS:  DELAY OF 12.5 MS TO 102.4 SEC (1.023 MHZ)
* DESTROYS: A,X,Y,ADDR0,ADDR1
* CALLS:    LODELAY, HIDELAY
*
DODELAY   LDA  ADDR1        LOW PART OF DELAY COMMAND
          BEQ  NOLODEL      NO LOW DELAY
DOLODEL   JSR  LODELAY      12.5 MS
          DEC  ADDR1
          BNE  DOLODEL
*
NOLODEL   LDA  ADDR0        HI PART OF DELAY COMMAND
          AND  #$3F         REMOVE C0 COMMAND
          STA  ADDR0
          BEQ  NOHIDEL      NO HI DELAY
DOHIDEL   JSR  HIDELAY      3.2 SEC
          DEC  ADDR0
          BNE  DOHIDEL
NOHIDEL   RTS

*
********** HIDELAY **********
*
* FUNCTION: HIGHER PART OF DODELAY
* INPUTS:   NONE
* OUTPUTS:  3.2 SECOND DELAY
* DESTROYS: A,X,Y
*
HIDELAY   LDX  #128         128 * 25 MS = 3.2 SECONDS
HIDEL1    TXA
          JSR  LODELAY      12.5 MS
          JSR  LODELAY      12.5 MS
          TAX
          DEX
          BNE  HIDEL1
*                           25 MS
          RTS

*
********** LODELAY **********
*
* FUNCTION: LOWER PART OF DODELAY
* INPUTS:   1.023 MHZ CLOCK
* OUTPUTS:  12.5 MS DELAY
* DESTROYS: X,Y
*
LODELAY   LDY  #25          25 *.5 =12.5 MS
LODEL2    LDX  #102
LODEL1    DEX               ;2
```

```
             BNE    LODEL1        ;3
*                                  5 CYCLES * 102 = 0.5 MS
             DEY
             BNE    LODEL2
             RTS
*
********** PRESET **********
*
* FUNCTION: PRESET DRAM HI ADDRESS, ALLOW FOR VARIABLE
*           BIT WIDTH MEMORY.
* INPUTS:   A= HIGH OFFSET
* OUTPUTS:  ADDRESS = (A),00. C SET ON OVERFLOW.
* DESTROYS: X
*
PRESET       PHA
SET          STA    PRE64         SET HI COUNTERS
             LDA    #$FD          /LOAD=0
             LDX    #$FF          /LOAD=1
             STA    MASTER
             STX    MASTER
             STA    MASTER        PRESET TWICE FOR INSURANCE
             STX    MASTER
             LDX    #$FF
             STX    PRE64         CHANGE TO INPUT PORT
             CLC                  ;CLEAR ERROR FLAG
PREBAD       PLA
             RTS
*
********** READ COMMAND **********
*
* FUNCTION: GET FIRST TWO BYTES FROM DRAM
* INPUTS:   NUMBITS FOR 'READMEM'
* OUTPUTS:  $0=>ADDR0, $1=>ADDR1
* DESTROYS: ADDR0,ADDR1,A
* CALLS:    PRESET, READMEM
*
READ01       LDA    #0            PRESET AT $0000
             JSR    PRESET
             JSR    READMEM
             STA    ADDR0
             JSR    READMEM
             STA    ADDR1
             RTS
*
********** READ MEMORY **********
*
* FUNCTION: GET FULL 8 BITS FROM DYNAMIC RAM
* INPUTS:   MUST BE PRESET TO ADDRESS, NUMBITS
* OUTPUTS:  A= DATA
* DESTROYS: A, BYTE
* CALLS:    READBIT
*
READMEM      JMP    READBIT       GETS ALL 8 BITS
*
READBIT      LDA    #$DF          NEXT=0
             STA    MASTER
             LDA    #$F7          NEXT=1, /EN=0
             STA    MASTER
             LDA    PRE64         READ DATA
             PHA
             LDA    #$FF          /EN =1
             STA    MASTER
             PLA
             RTS
*
************** SAY WORDS **************
*
* FUNCTION: SAY THE CURRENT WORD
* INPUTS:   AUTO INC RAM IS INDEXED TO PROPER DATA
* OUTPUTS:  SPEECH THROUGH THE TI 5220
* DESTROYS: A,X,Y,ADDR
* CALLS:    STATUS, WRITE, READMEM
*
SAY          JSR    STATUS        GET 5220 STATUS
             AND    #4            EXPOSE ONLY TALK STATUS
```

```
            BNE     SAY             WAIT TILL DONE TALKING (=0)
            LDA     #$60            SPEAK EXTERNAL COMMAND
            JSR     WRITE
            LDX     #5
            JSR     DELAY           MUST WAIT 42 US BEFORE DATA
            JSR     READMEM         GET DATA
            JSR     WRITE           PUT INTO 5220 FIFO REGISTER
*
* REFILL 5220 SPEECH DATA FIFO REGISTER
*
REFILL      LDX     #8              PUT 8 MORE BYTES IN
FILL        JSR     READMEM         GET DATA
            JSR     WRITE           PUT IN 5220
            DEX
            BNE     FILL            8 LOOPS
*
* SERVICE SYNTHESIZER
*
SERVE       LDA     MASTER          GET INTERRUPT STATUS
            ASL
            BMI     SERVE           WAIT TILL INTERRUPT IS LOW (BIT 6)
            JSR     STATUS          READ 5220 STATUS
            CMP     #6
            BEQ     REFILL          FIFO NEEDS MORE DATA
            CMP     #0
            BEQ     SAID            SAID WORD OK
            CMP     #4
            BEQ     SERVE           IGNORE FALSE INTERRUPT
            SEC                     ;SET ERROR FLAG
            RTS
SAID        CLC                     ;CLEAR ERROR FLAG
            RTS
*
**************   READ 5220 STATUS   ****************
*
* FUNCTION: PUT 5220 STATUS IN A
* INPUTS:   5220 STATUS
* OUTPUTS:  A:
*           -+-------------+-------------------+------------------+
*            I  TALKING    I   BUFFER LOW      I   BUFFER EMPTY   I
*           -+-------------+-------------------+------------------+
*            BIT  2                  1                  0
* DESTROYS: A,X
*
STATUS      NOP
            LDA     #$FF            BECOME INPUTS
            STA     D5220
            LDA     #$EF            /RS=0
            STA     MASTER          LOWER /RS
WAITR       LDA     MASTER
            BMI     WAITR           WAIT TILL /RDY IS LOW
            LDX     D5220           GET STATUS
            LDA     #$FF            /RS=1
            STA     MASTER          RAISE /RS
            TXA
            ROR
            ROR                     ;PLACE BITS 5-7 INTO BITS 0-2
            ROR
            ROR
            ROR
            AND     #7              MASK GARBAGE
            RTS
*
**************   WRITE TO 5220   ****************
*
* FUNCTION: OUTPUT A TO 5220, RETURN WHEN /RDY IS LOW
* INPUTS:   A
* OUTPUTS:  A TO 5220 DATA BUS
* DESTROYS: A
*
WRITE       STA     D5220           COMMAND OR DATA TO 5220
            LDA     #$FB            /WS=0
            STA     MASTER          LOWER /WS WRITE LINE
WAITW       LDA     MASTER
            BMI     WAITW           WAIT TILL /RDY LINE IS LOW
```

```
LDA  #$FF         /WS=1
STA  MASTER       RAISE /WS WRITE LINE
RTS
```

While the preferred embodiment of the invention has been described, it will be understood by those skilled in the art that numerous modifications and changes can be made without departing from the spirit of the invention. The claims that follow are intended to define the true spirit and scope of the invention.

What is claimed:

1. A phrase speaking computer system having a programmable digital computer and a speech processor, the speech processor comprising:

a voice synthesizer;

a read/write speech data segment memory;

a read/write command memory;

control processor means including processor control programs and logic connecting to said memories and to said voice synthesizer, and arranged to scan said command memory and to respond to command data entries stored therein by transferring corresponding speech data segments from said speech data segment memory to said voice synthesizer;

data conveyance means, connecting said computer to said command memory and said speech data segment memory, for transferring said command data entries supplied by said computer into said command memory and for transferring said speech data segments supplied by said computer into said speech data segment memory; and an enable signal line connecting said computer to said speech processor and arranged to initiate the operation of said processor control programs and logic when said enable signal line is enabled by said computer;

said programmable computer including speech control programs controlling the operation of said computer including data conveyance command sequences that cause said computer to supply command data entries to said data conveyance means and speech processor enabling command sequences that cause said computer to energize said enable signal line.

2. A phrase speaking computer system having a programmable digital computer and a speech processor, the speech processor comprising:

a voice synthesizer;

a speech data segment memory;

a command memory;

control processor means, including processor control programs and logic connecting to said memories and to said voice synthesizer, arranged to scan said command memory and to respond to command data entries stored therein by transferring corresponding speech data segments from said speech data segment memory to said voice synthesizer;

a time delay mechanism within said processor control programs and logic arranged to cause said speech processor to pause for a variable length of time in response to the scanning of certain patterns of command data entries within said command memory;

data conveyance means connecting said computer to said command memory for transferring said command data entries supplied by said computer into said command memory; and an enable signal line connecting said computer to said speech processor and arranged to initiate the operation of said processor control programs and logic when said enable signal line is enabled by said computer;

said programmable computer including speech control programs controlling the operation of said computer including data conveyance command sequences that cause said computer to supply command data entries to said data conveyance means and speech processor enabling command sequences that cause said computer to energize said enable signal line.

3. A phrase speaking computer system having a programmable digital computer and a speech processor, the speech processor comprising:

a voice synthesizer;

a speech data segment memory;

a command memory;

control processor means, including processor control programs and logic connecting to said memories and to said voice synthesizer, arranged to scan said command memory and to respond to command data entries stored therein by transferring corresponding speech data segments from said speech data segment memory to said voice synthesizer;

a speech data vector memory containing vector data that associates numeric codes of said command data entries with speech data segments in said speech data segment memory;

wherein said processor control programs and logic connect to said vector memory and utilize the vector data contained therein to determine which speech data segments are transferred to said speech synthesizer in response to the scanning of particular numeric codes within command data entries in said command memory;

data conveyance means connecting said computer to said command memory for transferring said command data entries supplied by said computer into said command memory; and an enable signal line connecting said computer to said speech processor and arranged to initiate the operation of said processor control programs and logic when said enable signal line is enabled by said computer;

said programmable computer including speech control programs controlling the operation of said computer including data conveyance command sequences that cause said computer to supply command data entries to said data conveyance means and speech processor enabling command sequences that cause said computer to energize said enable signal line.

4. A computer system in accordance with claim 2 wherein:

said time delay mechanism includes a counting mechanism that is initialized to a count value equal to the numeric value of at least a portion of one of said command data entries in said command memory and that counts the passage of a number of fixed length time intervals equal to the count value.

5. A computer system in accordance with claim 4 wherein:

the fixed length of time interval is a multiple of 12.5 milliseconds.

6. A computer system in accordance with claim 2 wherein:

said processor control programs and logic include command sequences that interpret a portion of the contents of each of the command data entries in said command memory as an indication of whether the remaining data in the entry defines a time delay interval or identifies a speech data segment that is to be transferred to the voice synthesizer.

7. A computer system in accordance with claim 3 wherein:

said data conveyance means also connects said programmable computer to said speech data vector memory.

8. A computer system in accordance with claim 7 wherein:

said data conveyance means also connects said programmable computer to said speech data segment memory.

9. A computer system in accordance with claim 3 wherein:

said processor control programs and logic include command sequences that interpret the contents of said data vector memory to be the starting addresses of speech data segments in said speech data segment memory.

10. A computer system in accordance with claim 9 wherein said speech processor includes:

a time dealy mechanism within said processor control programs and logic arranged to cause said speech processor to pause for a variable length of time in response to th scanning of certain patterns of the command data entries within said command memory.

11. A computer system in accordance with claim 10 wherein said time delay mechanism includes:

a counting mechanism that is initialized to a count value equal to the numeric value of at least a portion of a command data entry in said command memory and that counts the passage of a number of fixed-length time intervals equal to the count value.

12. A computer system in accordance with claim 11 wherein:

the fixed length time interval is a multiple of 12.5 milliseconds.

13. A computer system in accordance with claim 10 wherein said processor control programs and logic include:

command sequences that interpret a portion of the contents of each command data entry in said command memory as an indication of whether the remaining data in the command data entry defines a time delay interval or identifies a spech data segment that is to be transferred to the voice synthesizer.

14. A computer system in accordance with claim 9 wherein said processor control programs include:

command sequences that interpret at least a portion of some of the command data entries in said command memory to be the addresses of vectors in said data vector memory pointing to the starting addresses in said speech data segment memory of speech data segments that are to be transferred to said voice synthesizer.

15. A computer system in accordance with claim 14 wherein said speech processor includes:

a time delay mechanism within said processor control programs and logic arranged to cause said speech processor to pause for a variable length of time in response to the scanning of certain patterns of the command data entries within said command memory.

16. A computer system in accordance with claim 15 wherein said time delay mechanism includes:

a counting mechanism that is initialized to a count value equal to the numeric value of at least a portion of one of said command data entries in said command memory and that counts the passage of a number of fixed-length time intervals equal to the count value.

17. A computer system in accordance with claim 16 wherein:

the fixed length time interval is a multiple of 12.5 milliseconds.

18. A computer system in accordance with claim 15 wherein said processor control programs and logic include:

command sequences that interpret a portion of the contents of each command data entry in said command memory as an indication of whether the remaining data in the command data entry defines a time delay interval or a data vector memory address.

19. A computer system in accordance with claim 18 wherein said time delay mechanism includes:

a counting mechanism that is initialized to a count value equal to the numeric value of the remaining portion of the contents of a command data entry that defines a time delay interval, such that a first portion of the contents of each command data entry defines whether the remaining data is a time delay interval count value or an address in said data vector memory pointing to the starting address of a speech data segment in said speech data memory that is to be transferred to said voice synthesizer.

* * * * *

UNITED STATES PATENT AND TRADEMARK OFFICE
CERTIFICATE OF CORRECTION

PATENT NO. : 4,639,877  Page 1 of 3
DATED : January 27, 1987
INVENTOR(S) : William J. Raymond, et al.

It is certified that error appears in the above-identified patent and that said Letters Patent is hereby corrected as shown below:

Column 2, Line 6, change "speed" to --speech--.

Column 2, Line 53, change ""seven]" to --"seven"--.

Column 2, Line 60, change "which" to "when".

Column 3, Line 63, after "12" insert --,-- (comma).

Column 4, Line 59, after "them" start a new paragraph.

Column 5, Line 54, before "Logic" start a new paragraph.

Column 6, Line 10, change "sngle" to --single--.

Column 6, Line 55, after "to" insert --a--.

Column 7, Line 51, change "and" to --the--.

Column 8, Line 24, change "internals" to --intervals--.

Column 9, Line 28, change "port" to --Port--.

Column 9, Line 62, change "port" to --Port--.

Column 10, Line 21, change "Bus" to --bus--.

Column 10, Line 51, change "speed" to --speech--.

Column 10, Line 66, change "Phase 0" to --PHASE 0--.

Column 12, Line 32, after "amplifies" insert --it--.

Column 12, Lines 33-38, delete entire paragraph.

Column 12, Lines 39-64, delete entire paragraphs.

Column 13, Line 13, change "at" to --a--.

Column 13, Line 18, after "feed" insert --a--.

Column 13, Line 47, change "port" to --Port--.

Column 14, Line 33, change "0" to --0--.

UNITED STATES PATENT AND TRADEMARK OFFICE
CERTIFICATE OF CORRECTION

PATENT NO. : 4,639,877

DATED : January 27, 1987

INVENTOR(S) : William J. Raymond, et al.

It is certified that error appears in the above-identified patent and that said Letters Patent is hereby corrected as shown below:

Column 16, Line 26, change "port" to --Port--.

Column 16, Line 28, change "whle" to --while--.

Column 16, Line 29, change "port" to --Port--.

Column 16, Line 30, change "port" to --Port--.

Column 16, Line 31, change "port" to --Port--.

Column 16, Line 43, change "port" to --Port--.

Column 16, Line 45, change "port" to --Port--.

Column 16, Line 47, change "port" to --Port--.

Column 17, Line 62, change "and" to --at--.

Column 18, Line 38, change "(1512," to --(1512),--.

Column 18, Line 66, change "187" to --18--.

Column 19, Line 15, change "subroutine" to --Subroutine--.

Column 35, Line 6, change "port" to --Port--.

Column 35, Line 7, change "port" to --Port--.

Column 35, Line 8, change "port" to --Port--.

UNITED STATES PATENT AND TRADEMARK OFFICE
CERTIFICATE OF CORRECTION

PATENT NO. : 4,639,877     Page 3 of 3

DATED : January 27, 1987

INVENTOR(S) : William J. Raymond, et al.

It is certified that error appears in the above-identified patent and that said Letters Patent is hereby corrected as shown below:

Column 35, Line 8, change "address" to --addressed--.

Column 35, Line 8, change "port" to --Port--.

Column 41, Line 48, after "FIG. 24" insert --.-- (period).

Column 51, Line 31, change "dealy" to --delay--.

Column 52, Line 1, change "spech" to --speech--.

Signed and Sealed this

First Day of September, 1987

Attest:

DONALD J. QUIGG

*Attesting Officer*     *Commissioner of Patents and Trademarks*